US007567953B2

(12) United States Patent
Kadayam et al.

(10) Patent No.: US 7,567,953 B2
(45) Date of Patent: Jul. 28, 2009

(54) SYSTEM AND METHOD FOR RETRIEVING AND ORGANIZING INFORMATION FROM DISPARATE COMPUTER NETWORK INFORMATION SOURCES

(75) Inventors: Sundar Kadayam, Blue Ash, OH (US); Gregory J. Bishop, Delhi Township, OH (US); William A. Miller, Delhi Township, OH (US); Viral Vora, West Chester, OH (US)

(73) Assignee: Business Objects Americas, San Jose, CA (US)

( * ) Notice: Subject to any disclaimer, the term of this patent is extended or adjusted under 35 U.S.C. 154(b) by 629 days.

(21) Appl. No.: 10/378,554

(22) Filed: Mar. 3, 2003

(65) Prior Publication Data

US 2003/0212673 A1 Nov. 13, 2003

Related U.S. Application Data

(60) Provisional application No. 60/360,754, filed on Mar. 1, 2002.

(51) Int. Cl.
*G06F 17/30* (2006.01)
(52) U.S. Cl. .................................. 707/3; 707/10; 707/4
(58) Field of Classification Search ...................... 707/3, 707/4, 10
See application file for complete search history.

(56) References Cited

U.S. PATENT DOCUMENTS

| 5,628,011 | A | * | 5/1997 | Ahamed et al. ............... 707/10 |
| 5,768,580 | A | * | 6/1998 | Wical .......................... 707/102 |
| 5,859,972 | A | | 1/1999 | Subramaniam et al. |
| 5,940,821 | A | * | 8/1999 | Wical ............................. 707/3 |
| 6,028,605 | A | | 2/2000 | Conrad |
| 6,038,560 | A | * | 3/2000 | Wical ............................. 707/5 |
| 6,175,830 | B1 | | 1/2001 | Maynard |

(Continued)

OTHER PUBLICATIONS

Casasola E. et al., "Intelligent Information Agents for the World Wide Web," Information and Telecommunication Technology Center, Technical Report: ITTC-FY97-11100-1, University of Kansas, 1997, 15 pp.

(Continued)

*Primary Examiner*—Jean M Corrielus
(74) *Attorney, Agent, or Firm*—Cooley Godward Kronish LLP

(57) ABSTRACT

A system and method is provided for accessing information from a plurality of searchable information sources. The method includes the steps of: analyzing a user search query to determine a subject matter of the query; and selecting a subset of information from the plurality of information sources based upon the determined subject matter of the query. In further detailed embodiment, the analyzing step combines at least two methods of deriving the subject matter from the search query; and the method further includes the step of searching the information source(s) in the sub-set of information sources, substantially in parallel, for documents relevant to the search query. A system and method is also provided for searching a plurality of searchable information sources, where the information sources include at least one secure source. This method includes the steps of: (a) storing security credentials necessary for accessing the secure source; (b) accessing the secure source utilizing the stored security credentials; (c) accessing a non-secure source; (d) searching the accessed sources, substantially in parallel, for documents relevant to a search query; and (e) displaying results of the searching step.

14 Claims, 19 Drawing Sheets

U.S. PATENT DOCUMENTS

| | | | |
|---|---|---|---|
| 6,233,586 | B1 | 5/2001 | Chang et al. |
| 6,263,342 | B1 | 7/2001 | Chang et al. |
| 6,272,488 | B1 | 8/2001 | Chang et al. |
| 6,370,541 | B1 | 4/2002 | Chou et al. |
| 6,446,083 | B1* | 9/2002 | Leight et al. ............ 707/104.1 |
| 6,463,430 | B1* | 10/2002 | Brady et al. .................... 707/3 |
| 6,466,933 | B1 | 10/2002 | Huang et al. |
| 6,484,166 | B1 | 11/2002 | Maynard |
| 6,513,027 | B1* | 1/2003 | Powers et al. ................. 706/47 |
| 6,647,383 | B1* | 11/2003 | August et al. .................. 707/3 |
| 6,650,998 | B1* | 11/2003 | Rutledge et al. ............ 701/211 |
| 6,665,681 | B1* | 12/2003 | Vogel ......................... 707/101 |
| 6,859,937 | B1* | 2/2005 | Narayan et al. ............... 725/37 |
| 6,868,525 | B1* | 3/2005 | Szabo ....................... 715/738 |
| 6,920,448 | B2* | 7/2005 | Kincaid et al. ................. 707/3 |
| 6,994,612 | B2 | 2/2006 | Cron |
| 7,031,961 | B2* | 4/2006 | Pitkow et al. .................. 707/4 |
| 7,181,438 | B1* | 2/2007 | Szabo ........................... 707/2 |
| 7,343,371 | B2 | 3/2008 | Ibuki |
| 2001/0037332 | A1 | 11/2001 | Miller |
| 2001/0039592 | A1* | 11/2001 | Carden ...................... 709/245 |
| 2002/0026443 | A1 | 2/2002 | Chang et al. |
| 2002/0055946 | A1 | 5/2002 | Prager et al. |
| 2002/0120685 | A1 | 8/2002 | Srivastava et al. |
| 2002/0124116 | A1 | 9/2002 | Yaung |
| 2002/0174122 | A1 | 11/2002 | Chou et al. |
| 2002/0188621 | A1 | 12/2002 | Flank et al. |
| 2002/0194197 | A1 | 12/2002 | Flank |
| 2002/0194198 | A1 | 12/2002 | Flank et al. |
| 2002/0194199 | A1 | 12/2002 | Flank |
| 2002/0194200 | A1 | 12/2002 | Flank et al. |
| 2003/0004931 | A1 | 1/2003 | Soetarman et al. |
| 2003/0004968 | A1 | 1/2003 | Romer et al. |
| 2003/0041054 | A1 | 2/2003 | Mao et al. |
| 2003/0120653 | A1* | 6/2003 | Brady et al. .................... 707/7 |
| 2003/0217335 | A1* | 11/2003 | Chung et al. ................ 715/514 |
| 2004/0100510 | A1* | 5/2004 | Milic-Frayling et al. .... 345/864 |
| 2005/0278321 | A1* | 12/2005 | Vailaya et al. ................. 707/3 |
| 2005/0288920 | A1* | 12/2005 | Green et al. .................... 704/3 |
| 2005/0289168 | A1* | 12/2005 | Green et al. ................ 707/101 |

OTHER PUBLICATIONS

Sugiura A. et al., "Query Routing for Web Search Engines: Architecture and Experiments," Proceedings of the 9th International World-Wide Web Conference, Foretec Seminars, Inc., 2000 (http://www9.org/w9cdrom/139/139.html, Feb. 21, 2003) 18 pp.

Glover E. et al., "Architecture of a Metasearch Engine that Supports User Information Needs," Proceedings of the Eighth International Conference on Information Knowledge Management (CIKM-99), copyright 1999 ACM, pp. 210-216.

Zhu X. et al., "Oncology-Based Web Site Mapping for Information Exploration," submitted to CIKM-99, 1999, 7 pp.

Fan Y. et al., "Adaptive Agents for Information Gathering from Multiple, Distributed Information Sources," Proceedings of the 1999 AAAI Symposium on Intelligent Agents in Cyberspace, Stanford University, Mar. 1999 (http://www.ittc.ukans.edu/~sgauch/papers/AAAI99paper.html, May 31, 2000) 11 pp.

Etioni O. et al., "Digital Libraries Research," Department of Computer Science & Engineering, University of Washington, Jan. 1, 1999 (http://www.cs.washington.edu/research/digilib/, May 24, 2000) 2 pp.

Casasola E., et al., "Intelligent Information Agents for the World Wide Web," Information and Telecommunication Technology Center, Technical Report: ITTC-FY97-11100-1, University of Kansas, 1997, 15 pp.

Sugiura A., et al., "Query Routing for Web Search Engines: Architectures and Experiments," Proceedings of the 9th International World-Wide Web Conference, Foretec Seminars, Inc., 2000 (http://www9.org/w9cdrom/139/139.html, Feb. 21, 2003) pp. 1-18.

Glover E., et al., "Architecture of a Metasearch Engine that Supports user Information Needs," Proceedings of the $8^{th}$ International Conference on Information Knowledge Management (CIKM-99), Copyright 1999 ACM, pp. 210-216.

Zhu, X., et al., "Oncology-Based Web Site Mapping for Information Exploration," submitted to CIKM-99, 1999, 7 pp.

Fan Y., et al., "Adaptive Agents for Information Gathering from Multiple Distributed Information Sources," Proceedings of the 1999 AAAI Symposium on Intelligent Agents in Cyberspace, Stanford University, Mar. 1999 (http://www.ittc.ukans.edu/~sgauch/papers/AAI99papers.html, May 31, 2000, pp. 1-11.

Etioni O., et al., "Digital Libraries Research," Department of Computer Science & Engineering, University of Washington, Jan. 1, 1999 (http://www.cs.washington.edu/research/diglib/, May 24, 2000, pp. 1-2.

E. Casasola and S. Gauch: Intelligent Information Agents for the World Wide Web. Technical Report ITTC-FY97-1110-1, Information and Telecommunication Technology Center, The University of Kansas, (1997).

O. Etioni and D. Weld: Automatic Reference Librarians for the World Wide Web. Digital Libraries Research, Department of Computer Science & Engineering, University of Washinton, Jan. 1, 1999.

Y. Fan, S. Gauch, Motorola, Inc. and Dept. of Electrical Engineering and Computer Science, U. of Kansas: Adaptive Agents for Information Gathering from Multiple, Distributed Information Sources. Proceedings of 1999 AAAI Symposium on Intelligent Agents in Cyberspace, Stanford University, Mar. 1999.

X. Zhu, S. Gauch, L. Gerhard, N. Kral, and A. Pretschner: Ontology Based Web Site Mapping for Information Exploration, 1999. Submitted to CIKM-99.

E. Glover, S. Lawrence, W. Birmingham, and C. Giles: Architecture of a Metasearch Engine that Supports User Information Needs. Proceedings of the Eighth International Conference on Information Knowledge Management, (CIKM-99), pp. 210-216, Copyright 1999, ACM.

A. Sugiura and O. Etzioni: Query Routing for Web Search Engines: Architecture and Experiments. Proceedings of 9th International World-Wide Web Conference. Foretec Seminars, Inc., (2000).

* cited by examiner

FIG. 5

Companies.txt - Notepad
File Edit Format Help

Ponte Nossa Acquisition Corp
Urban Shopping Center Inc
Classic Mining Corp
Ethika Corp
Luna Medical Technologies Inc
United Rentals, Ic
Jakks Pacific Inc
Starbase-1 Coffee Company
Heritage oaks Bancorp
URS Corp
MSB Financial Inc
1st Colonial National Bank
Silverado Gold Mines Ltd
Entropin Inc
Petsec Energy Ltd
US Bancorp
U S Can Corp
Mason Hill Holdings Inc
Bali Jewelry Ltd
USG Corp
US Industries, Inc
U.S. Liquieds, I
United States Ce
Sykes Enterprises
MS Carriers
Bio-Medical
Microsembl
UST Inc
USEC Inc
US Restatio "Company Names"
List of Company Names in the USA (publicly traded)

TickerSym
File Edit View Insert
Format Help

PNSA.OB
JHMBX
TXCXX
CSGUX
PBHXX
FASCX
KMMXX
SGSYX
URB
SORLX
DRBDX
PSBDX
AM.OB
KA.OB
AX
...
HEOP.OB
URS
SSCCX

"Ticker Symbols"
List of ticker symbols of publicly traded companies in the USA

```
<title>Health Questions and Answers</title>
<id>74</id>
<engines>
    <engine>
        <engine>Doctor00</engine>
        <weight>0.45</weight>
    </engine>
    <engine>
        <engine>Health00</engine>
        <weight>0.52</weight>
    </engine>
    <engine>
        <engine>intel00</engine>
        <weight>0.54</weight>
    </engine>
    <engine>
        <engine>Lookit00</engine>
        <weight>0.5</weight>
    </engine>
    <engine>
        <engine>MAYOHe00</engine>
        <weight>0.61</weight>  — 57
    </engine>
    <engine>
        <engine>Nation00</engine>
        <weight>0.51</weight>
    </engine>
    <engine>
        <engine>Parent00</engine>
        <weight>0.59</weight>
    </engine>
    <engine>
        <engine>Parent01</engine>
        <weight>0.52</weight>
    </engine>
```

Source Ranking

Here, the "Mayo Health" database source has been rated as the best performing by the system on the subject of "Health"

```
url=http://www.intelihealth.com
Name=InteliHealth
NumberofResults=20
Connections=25
SupportQuote=1
CommonQuery-criteria-fitness DefaultSupport=1
QueryString1=http://www.intelihealth.com/cgi-bin/avsearch.mpl?index=ICN&nxt=1&adv=t&WEB_
HOME=%2FIH%2F&WEB_HOST=http%3A%2Fwww.intelihealth.com&MIVAL=ihtIH&P=%7Ebr%2CIHW
St%2C409%7C%7Er%2CWSIHW000%7C%7EbX2C*X7C&T=408&ST=408&submitbutton.x=5&submitb
&
QueryTerms=criteria=queryterm
Method=GET
Prefix=
Regex=[\d]\)\s<A HREF=([A>]+)><B>(.#?)<VB><VA. *?<BR>(.*?)<BR><FONT>\ SIZE=-1>
Groups=1=Url;2=Title;3=Summary
NumGroups=3

PhraseSupport=1
PhraseQueryString1=http://www.intelihealth.
T&WEB_HOME=%2FIH%22F&WEB_HOST
%7CX7Est%2C408%7C%7Er%2CWSIHW00
N.y=10&
PhraseQueryTerms=criteria=queryterm
PhaseMethod=GET
PhrasePrefix=
PhraseRegex=[\d]\)\s<A HREF=([A>]+)><B
PhraseGroups=1=Url;2=Title;3=Summary
PhraseNumGroups=3

BooleanSupport=1
BooleanQueryString1=http://www.intelihealth.com/cgi-bin/avsearch.mpl?index=ICN&nxt=1adv
=t&WEB_HOME=%2FIH%2F&WEB_HOST=http%3A%2F%2Fwww.intelihealth.com&MIVAL=ihtIH&P
W%7C%7Est%2C408%7C%7Er%2CWSIHW000%7C%7Eb%2C*%7C&T=408&ST-
408&submitbutton.x=5&submitbutton.=10&
BooleanQueryTerms-criteria-queryterm
BooleanMethod=GET
BooleanPrefix=
BooleanRegex=[\d]\)\s<A HREF=([A>]+)><B>(.*?)<VB><VA>. *?<BR>(.*?)<BR><FONT\ SIZE=-1>
BooleanGroups=1=Url;2=Title;3=Summary
BooleanNumGroups=3

Mappings=AND=AND;%26=AND;OR=OR;%7C=OR;NOT=NOT;%21=NOT;NEAR=NEAR;%7E=NEAR
```

Broker Definition

A Broker is represented as a single data file with information to a) communicate with a searchable source, b) send queries in the native form to it, c) interpret results that it returns, and d) navigate through multiple 'pages' of the result set

SYSTEM AND METHOD FOR RETRIEVING AND ORGANIZING INFORMATION FROM DISPARATE COMPUTER NETWORK INFORMATION SOURCES

CROSS REFERENCE TO RELATED APPLICATIONS

The present application claims the benefit from U.S. Provisional Patent Application Ser. No. 60/360,754, filed Mar. 1, 2002; the contents of which are incorporated herein by reference.

BACKGROUND

The present invention is a computerized system and method for searching through and retrieving information from a plurality of information sources; and more particularly, the present invention is an enterprise-scale system and method for searching for and retrieving information from a plurality of disparate electronic information sources within a large computer network and/or from the Internet.

A federated search system, by its very definition, distributes search queries in real-time to the information sources selected for querying. In a very large scale federated search system, one that involves hundreds or even thousands of information sources, the method of real-time querying of large numbers of information sources becomes impractical. It is desired to bring some intelligence to the search process that would permit an appropriate subset of the information sources to be selected for querying rather than all the available sources.

Secure information sources within a federated search system also pose a unique set of challenges. At a fundamental level, the federated search system should be able to proxy the user credentials to a secure information source (i.e., make it appear to the secure information source that the user was natively interacting with it). This is complicated, however, by the following circumstances: multiple secure information sources could be in the searching mix at the same time; each secure information source could require different methods for handling security (this can include LDAP, HTTP-basic authentication, HTTPS, cookie-based authentication using custom forms, proprietary single-sign-ons, etc.); and the system should transparently handle the security log-ins, parameters and protocols for multiple users, possibly accessing multiple secure information sources at the same time.

Finally, in a large federated search system, a reasonable effort could involve manually creating brokers (sometimes referred to as "wrappers") to define and interface between the system and the respective multiple searchable information sources accessed by the system. It is desired to reduce user interaction needed to create and maintain the brokers by providing an automated, or semi-automated broker generation capability.

SUMMARY

The present invention provides an enterprise-scale system and method for searching and retrieving electronic information from disparate electronic information sources within a large organization (an intranet) and/or from the Internet. At the heart of the system is a "federated search" architecture and system that enables a single search query from a user to be delivered in real-time to various selected islands of information. Depending upon the embodiment, the system can collate results, removes duplicates and dead-links, apply composite relevance scoring, and deliver the relevant results to the user.

In an exemplary embodiment, each island of information is a searchable source that is represented in the system by a "broker", which defines how the system accesses the respective information source and how the system handles the interface between the system and the information source. Further, in the exemplary embodiment, a broker-definition tool referred to as the "agent development kit" (ADK) is used to create the brokers in a semi-automated fashion (and, possibly, a completely automated fashion) and deploy them to the live, operational system.

The exemplary embodiment of the system and method of the present invention also provides a technique, referred to as "adaptive search", which intelligently selects subsets of information sources (from a body of available information sources) to route search queries to in the large federated search scenario. The selection of sources is based upon an analysis of the subject matter of the query. The search in this selected subset of information sources can occur automatically, or the user can be provided the option to have the search run in this subset of information sources (when the general search results are displayed, for example).

This adaptive search function is facilitated, in the exemplary embodiment, by the use of a knowledge-base (also referred to as a "subject taxonomy"), which is a hierarchical arrangements of subjects, where each subject is represented by a "fingerprint" of information that will typically be found in documents specific to such subjects. These fingerprints can be generated from example documents provided for each of the subjects in the taxonomy. Subjects in the subject taxonomy can also be linked to entity lists, which provide a list of names, symbols or other terms typically associated with a respective subject. By comparing the search query against the subject taxonomy and/or the entity lists, the subject matter of the search query can be determined within a desired level of confidence.

The exemplary embodiment of the present invention also utilizes a comprehensive, multi-user, multi-source, multi-modal security handling architecture to allow users to query open sources (non-secure sources) as well as secure sources simultaneously in a substantially transparent fashion. Additionally, the exemplary embodiment of the present invention provides a methodology to incorporate the security handling protocols and parameters into the definitions of the brokers, again, in a semi-automated fashion.

Therefore, it is a first aspect of the present invention to provide A computer implemented method for accessing information from a plurality of searchable information sources. The method includes the steps of: (a) analyzing a user search query to determine a subject matter of the query; and (b) selecting a sub-set of information from the plurality of information sources based upon the determined subject matter of the query. In a detailed embodiment, the analyzing step combines at least two different methods of deriving a subject matter from the search query. In a further detailed embodiment, the method further includes the step of (c) searching at least one information source in the sub-set of information sources for documents relevant to the search query. In another alternate detailed embodiment, one deriving method of the analyzing step includes the step of comparing at least a portion of the search query against a plurality of entity lists, where each entity list includes a list of phrases, and where each of the phrases corresponds with one or more subject matters; and the comparing step includes the step of matching the phrase in an entity list against at least a portion of the search query, and upon such match, returning a subject matter corresponding to the matched phrase in the entity list.

In yet another alternate embodiment of the first aspect of the present invention, one deriving method of the analyzing step includes the step of comparing the search query against a knowledge base, where the knowledge base includes a taxonomy of subject matters and a set of terms for at least some of the respective subject matters in the taxonomy, where the set of terms represent information likely to be found for the respective subject matters; and the comparing step compares at least portions of the search query against the set of terms in the knowledge base to determine the respective subject matters of the matching terms. In a further detailed embodiment, the method further includes the step of building the knowledge base, where the building step includes the steps of: (i) defining a taxonomy of subject matters; (ii) for at least some of the subject matters in the taxonomy, providing at least one example document that represents content typically found for the respective subject matter; (iii) generating a set of terms from the example document; and (iv) linking the set of terms to the respective subject matter. In yet a further detailed embodiment, the taxonomy is structured as a multi-tier hierarchy. In an alternate detailed embodiment, the step of comparing the search query against the knowledge-base further includes a step of assigning a score to the determined subject matter based upon a confidence level of the comparison. In yet a further detailed embodiment, the step of determining a subject matter of the query further includes the steps of displaying one or more of the subject matters having a score greater than a predetermined threshold and selecting, by a user, at least one of the displayed subject matters. In yet another alternate detailed embodiment, the analyzing step determines a plurality of the subject matters, and the method further includes a step of organizing the determined plurality of subject matters according, at least in part, to the scores assigned to the plurality of subject matters.

In yet another alternate detailed embodiment of the first aspect of the present invention, the steps of selecting a sub-set of information sources includes the steps of (i) providing a category-to-source map that includes a plurality of categories, where the categories have at least one information source linked thereto, (ii) obtaining at least one category pertaining to the subject matter of the query, and (iii) adding the information source linked to the category in the category-to-source map to the sub-set of information sources. In a further detailed embodiment, each information source is assigned a performance score pertaining to at least one performance quality of the information source. In yet a further detailed embodiment, the method further includes the steps of searching at least one information source in the sub-set of information sources for document(s) relevant to the search query and displaying the search results from the output of the searching step, where the displaying step displays the search results in an order based upon, at least in part, the performance scores of the information sources from which the search results are obtained. In an alternate detailed embodiment, the performance quality is based upon the frequency that the respective information source is accessed, the amount of time spent accessing the respective information source, the frequency of problems accessing the respective information source, and/or feedback provided by users of the respective information source. In yet a further alternate detailed embodiment, the method further includes the step of eliminating from the sub-set of information sources any information source having a performance score lower than a predetermined threshold. In a alternate detailed embodiment of the first aspect of the present information, the method further includes the steps of (c) assigning each information source in the sub-set of information sources a performance score pertaining to performance qualities of the information source; (d) searching the information sources in the sub-set of information sources for documents relevant to the search query; and (e) displaying search results from the output of the searching step, where the search results are ordered based upon, at least in part, the performance scores of the information sources from which the search results are obtained. In a further detailed embodiment, the performance scores are calculated based, at least in part, upon the number of times the respective information source is accessed by a community of users.

In yet another alternate detailed embodiment of the first aspect of the present invention, the method further includes the steps of (c) searching the information sources in the sub-set of information sources for document relevant to the search query; and (d) displaying the search results from the output of the searching step, where the search results are segregated for each of the information sources in the sub-set of information sources. In a further detailed embodiment, the searching step searches the information sources in the sub-set of information sources substantially in parallel and the displaying step displays the segregated searches in parallel.

In yet a further detailed embodiment of the first aspect of the present invention, the method further includes the steps of: (c) searching a standard information source (such as the World Wide Web) for documents relevant to the search query; and (d) displaying the results of the step of searching the standard information source along with an option, selectable by the user, for searching the sub-set of information sources for documents relevant to the search query upon selection of the option by the user. As mentioned above, this standard information source could be the World Wide Web and further, the sub-set of information sources may be maintained, for example, on a private computer network. In a further detailed embodiment, the analyzing step determines a plurality of subject matters from the query, the selecting step selects a sub-set of information sources for each of the plurality of the subject matters determined in the analyzing step, the displaying step displays the plurality of options for each subject matter determined in the analyzing step, where each option is identified by its respective subject matter in the displaying step and where each option is provided for searching the sub-set of information sources associated therewith for documents relevant to the search query upon selection of the option by the user.

In yet a further detailed embodiment of the first aspect of the present invention, the method further includes the steps of (c) searching a standard information source for documents relevant to the search query, (d) searching the sub-set of information sources for documents relevant to the search query, and (e) simultaneously displaying the results of the step of searching the standard information source and the step of searching the sub-set of information sources. In a further detailed embodiment, the displaying step segregates the results of the step of searching the standard information source from the step of searching the sub-set of information sources.

In yet a further detailed embodiment of the first aspect of the present invention, the analyzing step determines a plurality of subject matters from the query, and the selecting step selects a sub-set of information sources for each of the plurality of subject matters determined in the analyzing step. In a further detailed embodiment, the method further includes the step of automatically searching the sub-set of information sources associated with the subject matter having the closest match to the search query for documents relevant to the search query.

It is the second aspect of the present invention to provide a computer-implemented method for searching a plurality of information sources, where the information sources include at least one secure source. This method includes the steps of: (a) storing security credentials necessary for accessing the secure source; (b) accessing the secure source utilizing the stored security credentials; (c) accessing a non-secure source; (d) searching the accessed sources, substantially in parallel, for documents relevant to a search query; and (e) displaying results of the searching step. In a further detailed embodiment, the plurality of information sources includes a plurality of secure sources, the step of storing security credentials includes the step of storing respective security credentials necessary for accessing each secure source, and the step of accessing the secure source involves the step of accessing the plurality of secure sources, substantially in parallel, using the respective stored security credentials. In yet a further detailed embodiment, the method operates on a computer network system having a plurality of users and the step of storing security credentials includes the step of storing respective security credentials for accessing each secure server by each user of the computer network system. In an alternate detailed embodiment, the security credentials are stored in a database that includes a table for each user, where each table includes a set of respective security credentials for accessing each secure source by each respective user. It is within the scope of the invention that at least certain of the security credentials may be shared by certain users (or groups of users) during the accessing and/or searching steps.

In an alternate detailed embodiment of the second aspect of the present invention, the step of storing security credentials includes the steps of recording a user's security credentials as the user preliminarily enters the secure source and storing the recorded user's security credentials for the step of accessing the secure server. In yet a further detailed embodiment, the stored user's security credentials are reusable for multiple steps of accessing the secured server. In an alternate detailed embodiment, the security credentials are used substantially transparently to the user during the step of accessing the secure server. In yet another alternate detailed embodiment, the step of accessing the secure source further includes the step of storing session cookies set by the source for the duration of the search process.

It is a third aspect of the present invention to provide a computer-implemented method for searching a plurality of searchable information sources by a plurality of users to a computer network system, where the information sources include at least one secure source. The method includes the steps of: (a) for each user, storing security credentials necessary for accessing the secure source; (b) accessing, by each user, the secure source utilizing the stored security credentials for each user; and (c) searching the accessed secure source, by the plurality of users, substantially in parallel, for documents relevant to one or more search queries. In a further detailed embodiment, the method further includes the step of (d) creating a session record for each user accessing the secure source. In a further detailed embodiment, the session record includes cookies, session parameters, session IDs, and/or a session state. In yet a further detailed embodiment, the information sources include a plurality of secure sources, the storing step includes the step of storing, for each user, security credentials necessary for accessing one or more of the plurality of the secure sources, the accessing step includes the step of accessing, by each user, one or more of the plurality of secure sources utilizing the stored security credentials for each user, and the searching step includes the step of searching the accessed secure sources, by the plurality of users, for documents relevant to one or more search queries. In yet a further detailed embodiment, a session record is created each time a user accesses a secure source.

In an alternate detailed embodiment of the third aspect of the present invention, the information sources include a plurality of secure sources, the storing step includes the step of storing, for each user, security credentials necessary for accessing one or more of the plurality of secure sources, the accessing step includes the step of accessing, by each user, one or more of the plurality of secure sources utilizing the stored security credentials for each user, and the searching step includes the step of searching the accessed secured sources, by the plurality of users, for documents relevant to one or more search queries.

It is a fourth aspect of the present invention to provide a computer implemented method for generating searchable source brokers for defining interface parameters specific to each of the searchable sources. The method includes the steps of: (a) accessing a given searchable source; (b) performing an example search on the given searchable source to produce search results by that searchable source; and (c) identifying regular expressions from the search results. In a further detailed embodiment, the method further includes the step of storing the regular expressions for the given searchable source for subsequent reuse by a federated search system. In a further detailed embodiment, the step of identifying regular expressions is performed substantially automatically, the method further includes the step of reviewing, by a user, output of applying the regular expressions to search results produced by the given searchable source, and the method further includes the step of approving by the user the regular expressions based upon the reviewing step. In a further detailed embodiment, the method further includes a step of modifying the regular expressions by the user before the approving step, if the user determines the modifying step is necessary based upon the reviewing step. In an alternative detailed embodiment, the reviewing step involves the step of simultaneously displaying to the user the search results produced by the given search and the output of applying the regular expressions to the search results.

In an alternate detailed embodiment of the fourth aspect of the present invention, the step of identifying regular expressions includes the steps of: (i) parsing the search results to distill a structure of the search results; (ii) identifying repeating blocks of information from the parsed search results; (iii) identifying essential search-result elements from the repeating blocks of information; and (iv) generating a regular expression for each identified essential search-result element and a regular expression for the repeating block. In a further detailed embodiment, the essential search-result elements include a title, a URL, a date, a keywords, a summary, a passage, and/or a score.

It is a fifth aspect of the present invention to provide a computer implemented method for accessing information from a plurality of searchable information sources. The method includes the steps of: analyzing a user's search query to determine a subject matter of the query; selecting a subset of information sources from the plurality of information sources based upon the determined subject matter of the query, wherein at least one of the subset of information sources is a secure information source; accessing the secure information source utilizing stored security credentials for the information source; and searching the information sources in the subset of information sources for documents relevant to the search query. In a more detailed embodiment the searching step involves the step of searching the information sources in the subset of information sources, substantially in parallel, for documents relevant to the query. In an alternate detailed embodiment, the step of accessing the secure information source utilizes the stored security credentials substantially automatically and substantially transparently to the user.

In another alternate detailed embodiment of the fifth aspect of the present invention the step of searching the information sources in the subset of information sources utilizes source brokers for each of the information sources in the subset of information sources, where the source brokers define patterns of search-result information specific to their respective information source. In a further detailed embodiment, the source broker for the secure information source includes the stored security credentials utilized in the accessing step. In an alternate detailed embodiment, method further includes the step of defining the source broker for each of the information sources in the subset of information sources. In a further detailed embodiment, the defining step includes the steps of: preliminarily accessing the respective information source; preliminarily performing an example search on the respective information source to produce example search results; identifying regular expressions from the example search results; and storing the regular expressions as at least part of the source broker. In a further detailed embodiment, the defining step further includes the steps of detecting whether the respective information source is a secure information source, and if the detecting step determines that the respective information source is a secure information source, performing the additional steps of: providing a log-in form for the secure information source; logging into the secure information source by entering the appropriate log-in information to the log-in form by the user; recording security credential information provided by the user during the logging step; and storing the security credential information with the respective source broker.

BRIEF DESCRIPTION OF THE DRAWINGS

FIG. 5 is an illustration of a source taxonomy, an organization of searchable information sources in XML format, of the exemplary embodiment;

FIG. 8 is an illustration of example entity lists according to the exemplary embodiment;

FIG. 11 is an illustration of the information performance source ranking structure according to the exemplary embodiment;

FIG. 12 is an example output representation of a broker definition generated by the broker-definition tool according to the exemplary embodiment;

FIG. 19 is an example screen shot of the exemplary embodiment illustrating secure source handling stage of the broker-definition tool.

DETAILED DESCRIPTION

Figure 1:
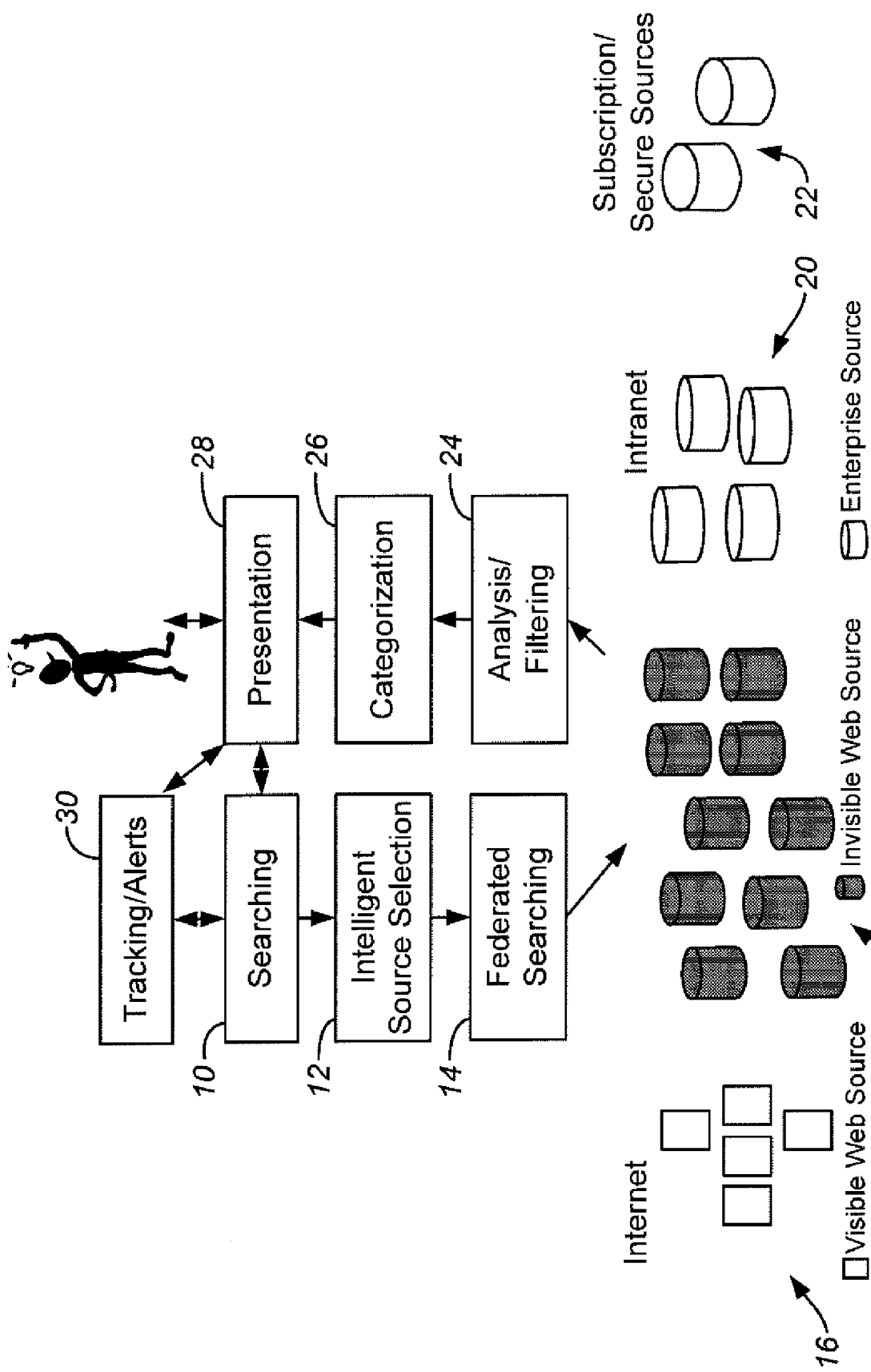
FIG. 1 is a general block diagram of the system architecture of the exemplary embodiment of the present invention.

The present invention provides an enterprise-scale system and method for searching and retrieving electronic information from disparate electronic information sources within a large organization (an intranet) and/or from the Internet. At the heart of the system is a "federated search" architecture and system that enables a single search query from a user to be delivered (preferably, in real-time) to various searchable information sources.

As used herein, "information source", "source" and "searchable information source" pertain to searchable information sources accessible over a data network such as, for example, the World Wide Web or a proprietary computer network. The searchable information sources will typically be search engines, or may include search engines or search capabilities associated therewith that provides the ability for a user to search the searchable information source for desired information. It is not necessary, however, for the searchable information source to have its own search capabilities embedded therein or associated therewith, as such search capabilities can be provided elsewhere. Examples of such searchable information sources accessible over the World Wide Web include, MSN.com, LYCOS.com, TEOMA.com, Intellihealth.com, WebMD.com, WSJ.com, etc. Likewise, "secure information source", "secure source" and "secure searchable information source" pertain to such searchable information sources that require certain security credentials (such as passwords, for example) to access and/or perform searches therein/therewith.

As used herein, "search query" and "query" pertain to an expression of the information that a user or system wishes or requests to search for in one or more searchable information sources. While the expression will typically be in the form of a term or phrase typed into a field of an electronic form by the user, it is within the scope of the invention that the expression be automatically generated and presented to the searchable information source(s) and it is within the scope of the invention that the expression be pre-stored and presented to the searchable information source(s).

As used herein, "document" means an electronic body or collection of information or data that the user or system will typically be provided access to by the searchable information source(s) in the search result(s) provided by the searchable information source(s) (although some searchable information sources only identify the documents, without providing access). This is typically the body or collection of information or data that the user/system is ultimately seeking in the searching process.

As used herein, the act of "searching" an information source or within an information source, and the act of "searching by" an information source pertains to the act of applying the search query to one or more of the searchable information sources to produce search results, which may or may not provide the user/system access to documents; but which will usually provide at least the identity of document(s) if the search is successful. It is to be understood that the present invention is not limited to any specific searching algorithm or technique.

As used herein, the act of "comparing" or "matching" a search query (or any other expression of information/data) against another expression of information/data pertains to the use of any available techniques and/or algorithms to perform a lexical comparison of the expression (or a portion of the expression) against terms, phrases or other expressions of information or data in the other entity. The results of this comparison often do not necessitate exact matches to be considered "successful"; and, thus, often include confidence scores with the results that indicate the relative confidence or closeness of the comparison. While the exemplary embodiments herein often refer to lexical comparisons, it is within the scope of the invention that alternate techniques/algorithms be used when the comparison is not a language-based comparison.

FIG. 1 provides a functional flow diagram representation of the federated search system deployed according to an exemplary embodiment of the present invention. The searching function 10 provides a configurable, hierarchically organized group of information sources, described below, to users to fulfill different information needs and requests from the multiple groups of users. A simple search involves taking search query terms from the user to conduct the search. An advanced search enables users to select multiple groups of sources, or multiple sources within a group, and to control many settings, including the depth of the search, analysis options, and time-outs. Personalized searching preferences are stored for each user by the system. Searches initiated in the system are conducted in real-time, and results are displayed in configurable web page format or in XML format.

In the intelligent source selection function 12, a user's search query is analyzed to determine the subject matter corresponding to the user's query. Upon identifying this subject matter of the search query, a sub-set of information sources can be isolated from the vast body of information sources to perform the search. For example, a search for "pancreatic cancer treatment protocol" can be determined by the system to be broadly based on the subject-heading of "health", and more specifically, on the specific subjects of "diseases and conditions", and "endocrine disorders". The subset of information sources is selected by consulting an information source hierarchy, or subject-to-source map, to find the best sources for the identified subject matters. These best performing sources can automatically be given preference for searching in real-time in addition to user-selected information sources, or these best sources can be offered as recommendations to the user for performing further related searches.

The federated searching function 14 implements the actual real-time, distributed searching mechanism. This function receives as inputs the search query parameters and other optional advance settings, and accesses one or more groups of information sources to perform the federated searching in all or certain subsets of the information sources. Information sources from which the real-time federated searching may be conducted include visible Web sources 16 accessible over the Internet, invisible Web sources 18 accessible over the Internet, enterprise sources 20 (private information sources accessible by the system over the system's intranet, for example), and subscription sources 22, which may be accessible over the Internet or through separate network connections. Each information source in the sub-set of selected information sources is searched by the system in real-time, with user credentials being transparently proxied, if necessary, to each secure source 22. Multi-processing and multi-threading mechanisms are implemented for scalability to large numbers of concurrently searched sources as well as large numbers of concurrent users searching with the system. This federated searching function 14 translates a user's search query into the native forms required for each information source, communicates with each information source using native protocols and methods, navigates through one or more search result sets from each source, extracts search result records including uniquely defined fields of information for each of the records from each source, normalizes the results, removes duplicates, and performs composite relevance ranking based upon specified, configurable relevance ranking criteria. An XML result stream is produced that can be operated upon by other components in the system.

The analysis/filtering function 24 is optionally triggered by the user to perform real-time retrieval and analysis of the full-text contents (documents) for each result from the composite result set delivered from the federated searching function 14. Each "document" is retrieved from the corresponding information source in the essential text content along with relevant meta-data is extracted from it. This function 24, in essence, "converts" content from different document formats like Adobe PDF, Microsoft Word, etc. to native text. The text and meta-data content corresponding to each result record is then passed through a real-time filtering component that takes one or more search queries representing the user's input and then determines the strength of match of the result to the user's need. In this analysis/filtering function 24, the passages (sentences or paragraphs) from the documents matching the user's query are extracted and ranked to determine the strength of the match and to compute a native "analysis score" which is used for relevance ranking purposes. Next, a dynamic summary is composed from the extracted passages for each matching document. Each result record is then enhanced with additional meta-data including an "analysis score", an updated relevance score, a dynamic summary snippet, as well as additional information when the result document doesn't match the user's query.

The categorization function 26 categorizes the results from the federated searching (and, optionally, the analysis/filtering function 24) into a configured subject taxonomy. An administrator first creates a taxonomy of subjects representing a given information domain, provides example documents for each subject, and runs an administrative tool to train the taxonomy and create a model that is used for the real-time categorization of the search result documents. During searching, the categorization process involves deriving a "fingerprint" (important terms representative of a respective content of the record, which can be phrases or individual words) from each result record and matching it with the taxonomy model configured for use in the system. The best matching subject is determined for each result record, and is tagged as additional meta-data in the result record. In the presentation function 28, the results from the previous steps of searching 10, analysis/filtering 24, and categorization 26 are received in XML. A standards-based template mechanism allows the results to be displayed rapidly in any desired format. Information can be organized into multiple views such as "by relevance," "by source", and "by concept." The relevance view orders the results at decreasing order based upon the "relevance score". The source view provides a graphical tree-view of the results organized by the sources from which they came from. And the concept view provides a graphical, tree-view of the results, organized into the matching taxonomy of subjects from the categorization process 26.

The tracking/alerts function 30 is an optional function that may be set up to run periodic searches for a given search query or set of search queries automatically and to alert the user when a desired set of results are obtained from the periodic searches, or when any results are obtained.

Figure 2:
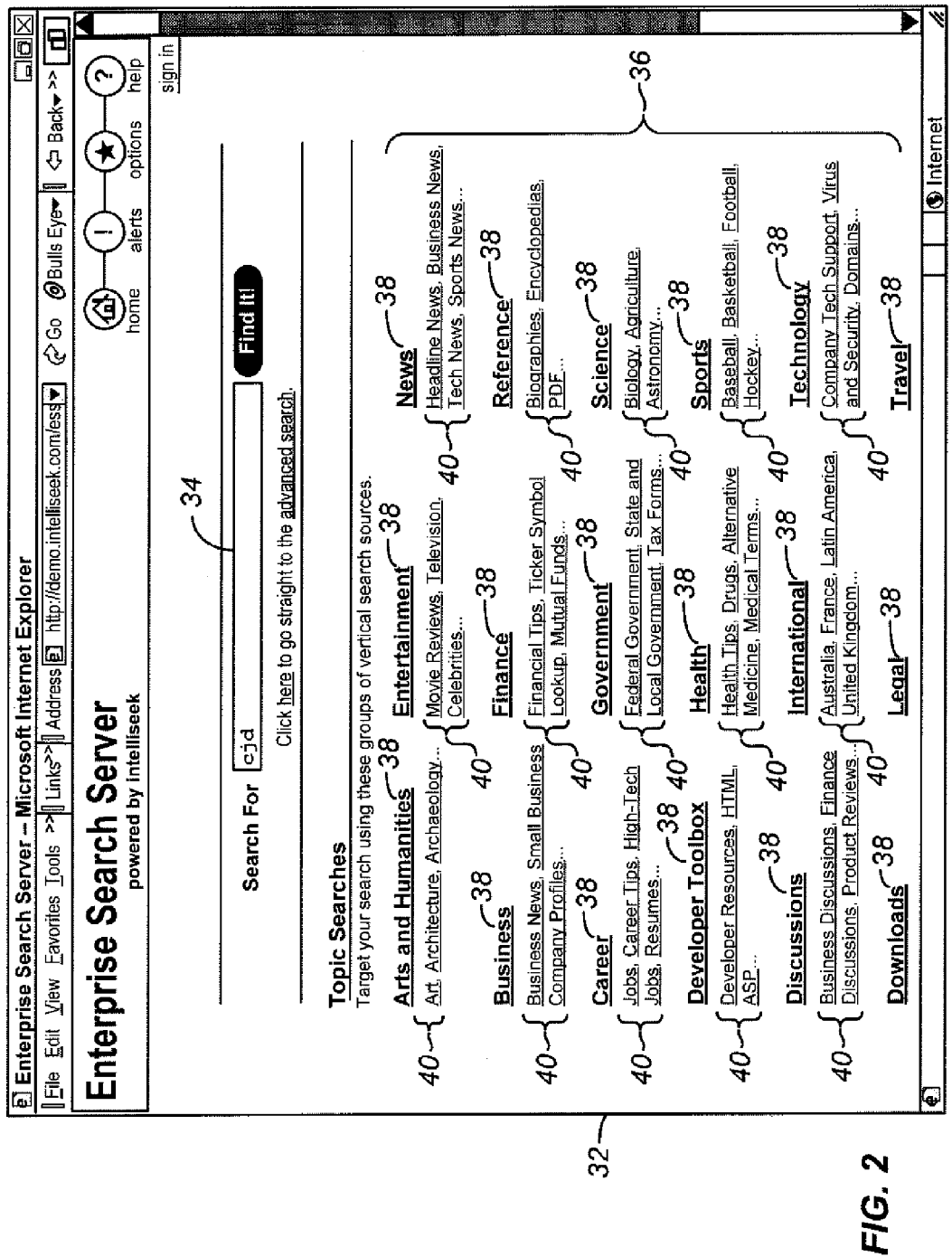
FIG. 2 is an example screen-shot illustrating the universal search interface of the exemplary embodiment.

Referring to FIG. 2, an example screen display 32 of initial searching screen provides a field 34 into which a searcher can enter a search query. If the user enters the search query in this field, the exemplary embodiment will perform an automatic search as described in further detail below. Optionally, prior to entering a search query, the user can select specific subjects from the source taxonomy 36 (provided in this exemplary embodiment in the form of hyperlinks) to allow the search to be performed within narrow sub-sets of information sources specific to the subject matter of interest. The taxonomy 36 in the exemplary embodiment includes an upper level of subjects 38 that generally define a subject matter and a second tier of more specific subject matters 40. As will be discussed in further detail below, upon selecting an identified subject (hyperlink) in the source taxonomy 36 displayed in the window 32, the system will then perform the searching in the specific sub-set of sources represented by the subject heading/subject 38/40 selected by the user.

Figure 3:
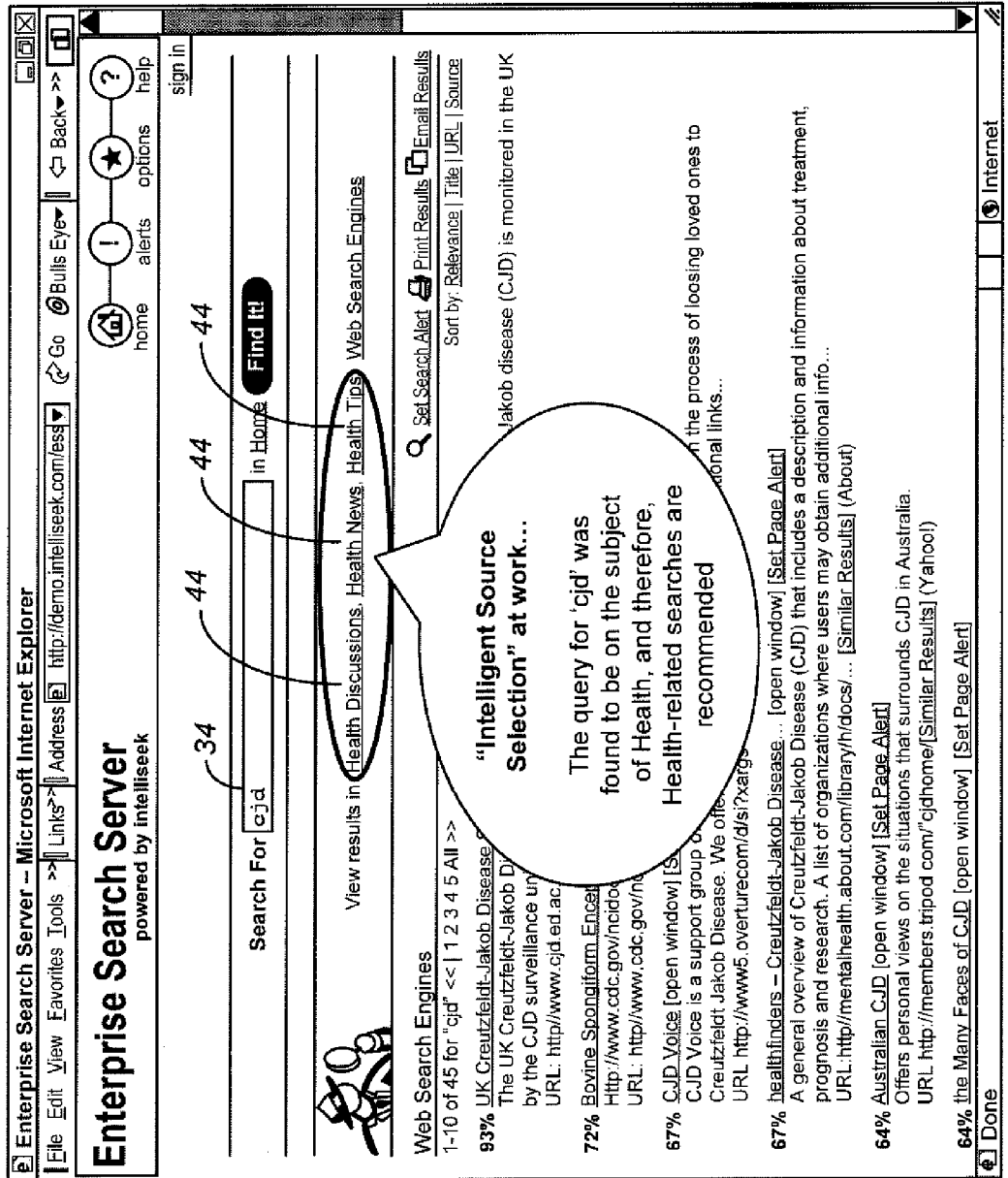
FIG. 3 is an example screen-shot of the exemplary embodiment illustrating intelligent source selection capabilities combined with general search results.

As shown in FIG. 3, an example screen shot 42 is provided that illustrates the results of performing a general search of the exemplary embodiment using the search query of "cjd". In the exemplary embodiment, if no specific subject headings 38 or subjects 40 are selected from the subject taxonomy 36, then the exemplary embodiment will perform the search set forth in the search query from a federated group of Web search engines (such as "MSN", "LYCOS", "TEOMA", etc.) and display the results of the search on the screen in order based upon relevance of the documents from the search results in comparison to the subject of the search query. Additionally, the exemplary embodiment also analyzes the search query to determine a subject matter (or subject matters) of the query and provides links to the subsets of information sources 44 (in the form of hyperlinks) associated with the subject matter(s) determined from the search query above the general search results. If the user selects the identified subsets of information sources 44, the system will perform the same search in the sub-set of information sources. Exemplary methods for identifying the subject matters from the search query 34 are discussed in further detail below. In the example shown in FIG. 3, the search query "cjd" was identified by the system as being related to the specific subject matters, "Health tips", "Health news" and "Health discussions". The system was able to make this recommendation based upon analyzing the query and identifying that the closest subject heading that it corresponded to was health; hence, the recommendation from the system that this search be conducted within "health-related" sources.

Figure 4:
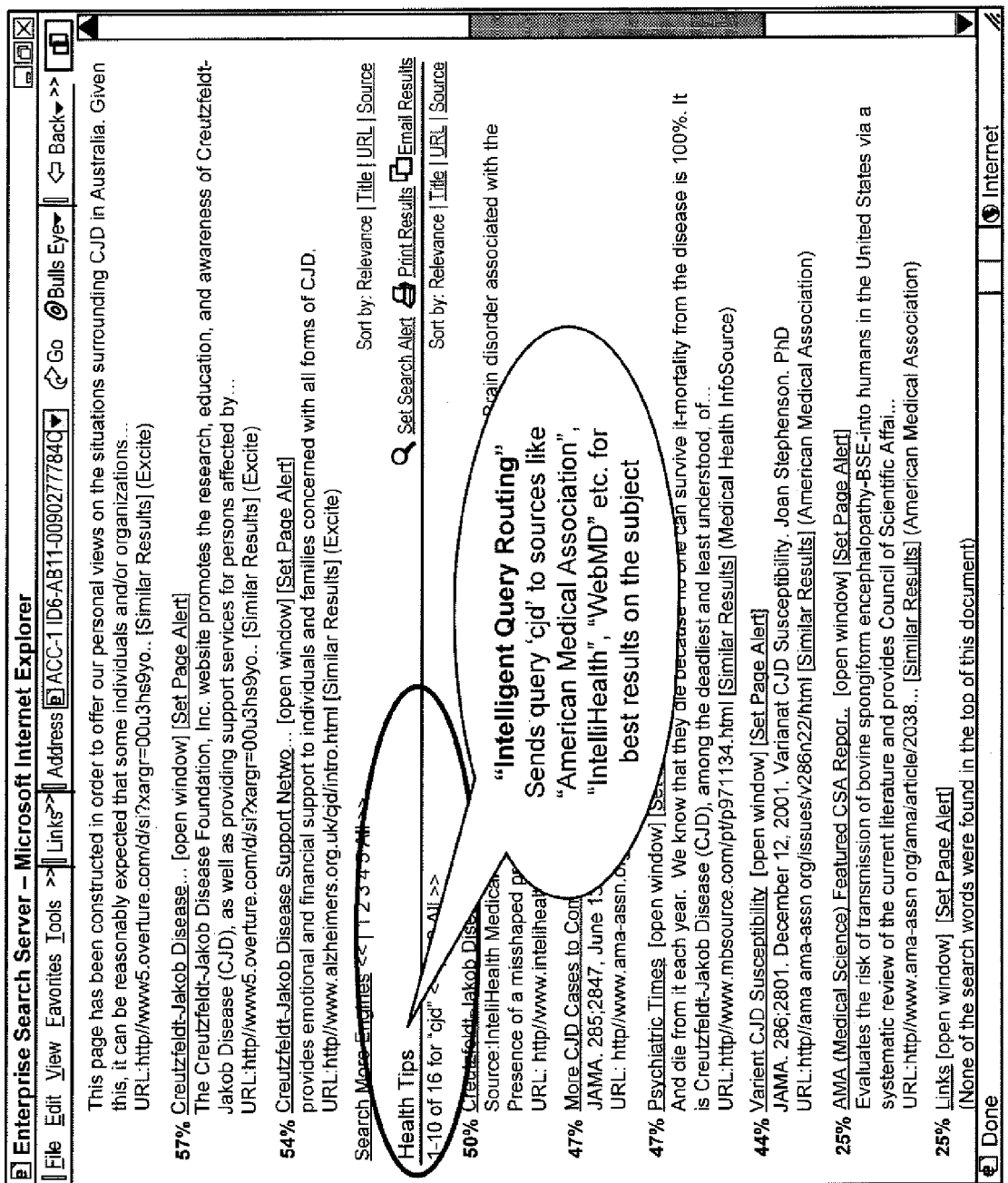
FIG. 4 is an example screen shot of the exemplary embodiment illustrating intelligent query routing to subsets of information sources with general search results.

As shown in FIG. 4, when a general search is requested, the exemplary embodiment may also be configured to automatically perform the search within a sub-set of information sources corresponding to a subject matter matching the search query. The display 46 shown in FIG. 4 illustrates that the specific search for the search query "cjd" was automatically conducted within the sub-set of information sources associated with the "Health Tips" subject matter. The search results resulting from this specific search may come from information sources such as "American Medical Association", "Intellihealth", and "WebMD", etc. for the best results on the subject.

Figure 5:
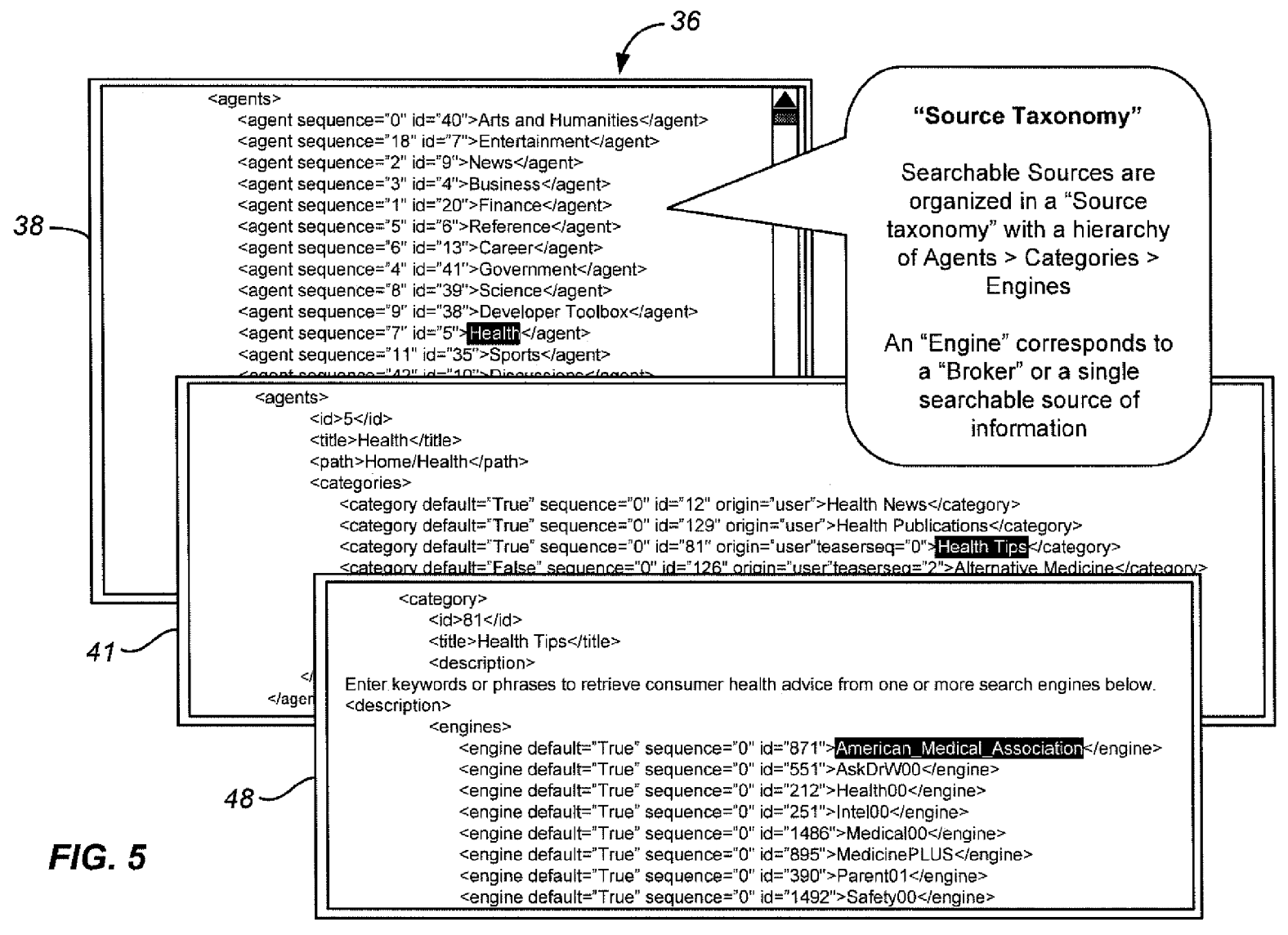
Figure 6:
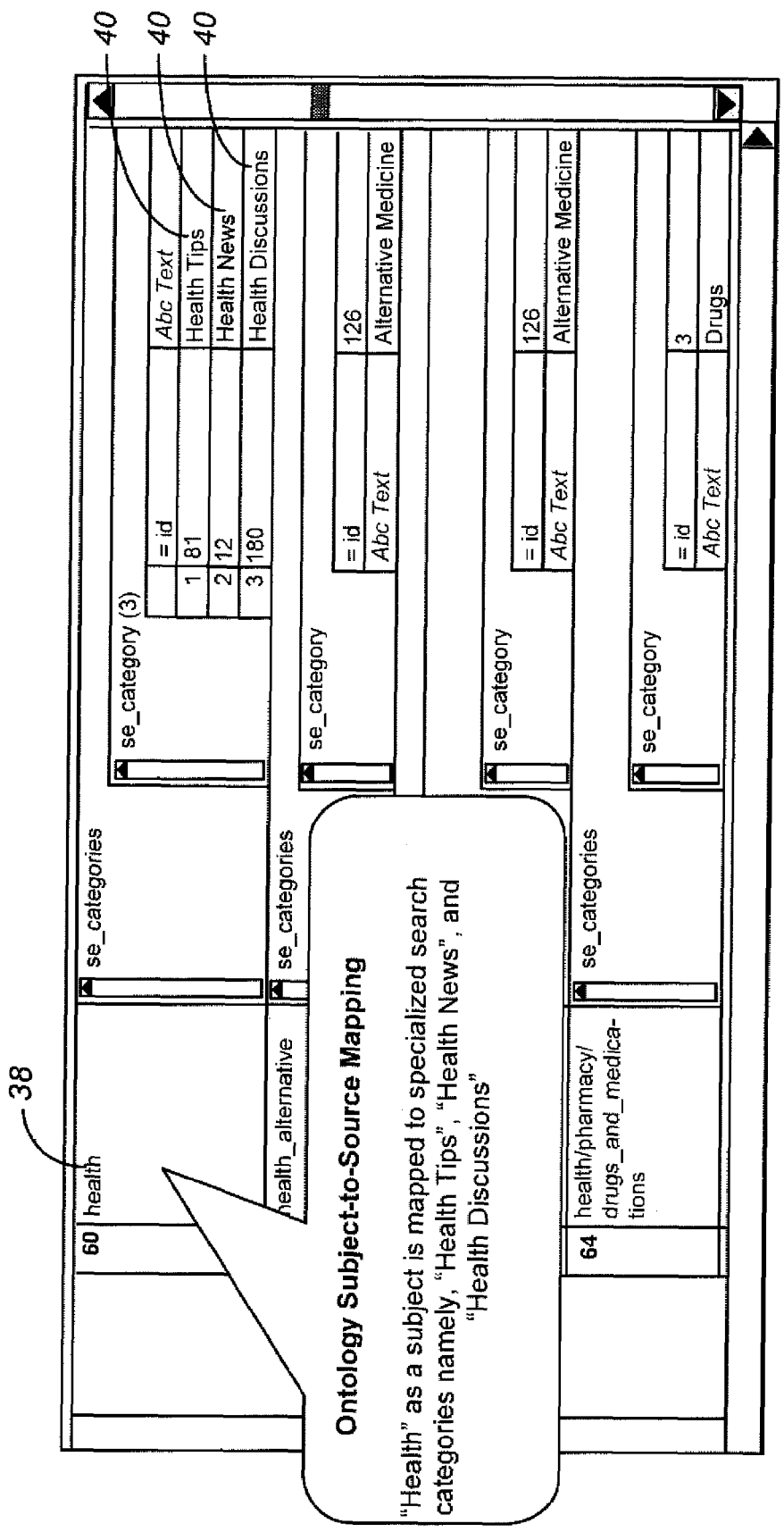
FIG. 6 is an illustration of a structure of mapping subjects to information sources, contained in an XML file, of the exemplary embodiment.

FIGS. 5 illustrates the exemplary structure of the source taxonomy 36, and FIG. 6 illustrates the exemplary subject-to-source map 42 (also referred to, herein, as a category-to-source map). As discussed above, the subject-to-source map 42 is used to identify one or more information sources corresponding to identified subject matters of the search query, to allow for more focused searching of the subject matter in these sources. The subject-to-source map 42, in the exemplary embodiment, is arranged as a hierarchy that includes an upper level of subject headings 38 (such as "health"), and for each subject heading 38 there are one or more information source subsets 41 such as "health news", "health publications", "health tips", and "alternative medicine" linked thereto. Finally, for information source subset 41, there are linked to it one ore more information sources 48. For example, the specific subject "health tips" will have linked to it information sources such as "American Medical Association", "Intellihealth.com", "WebMD.com", etc.

FIG. 6 more specifically illustrates how a subject in the ontology is mapped to a group of sources or to a single source-by an administrator in the exemplary embodiment. Health as a general subject 38 may be mapped to a group of searchable sources 40 called "health tips". The more narrow subjects under the general subject "health", such as "cancer", may be mapped to specialized sources providing information on cancer treatment, cancer trials, etc. The ability to map the subject headers and specific subjects to information source(s) is completely flexible and can be tuned to the needs of the specific search scenario in which the system will be used.

Figure 7:
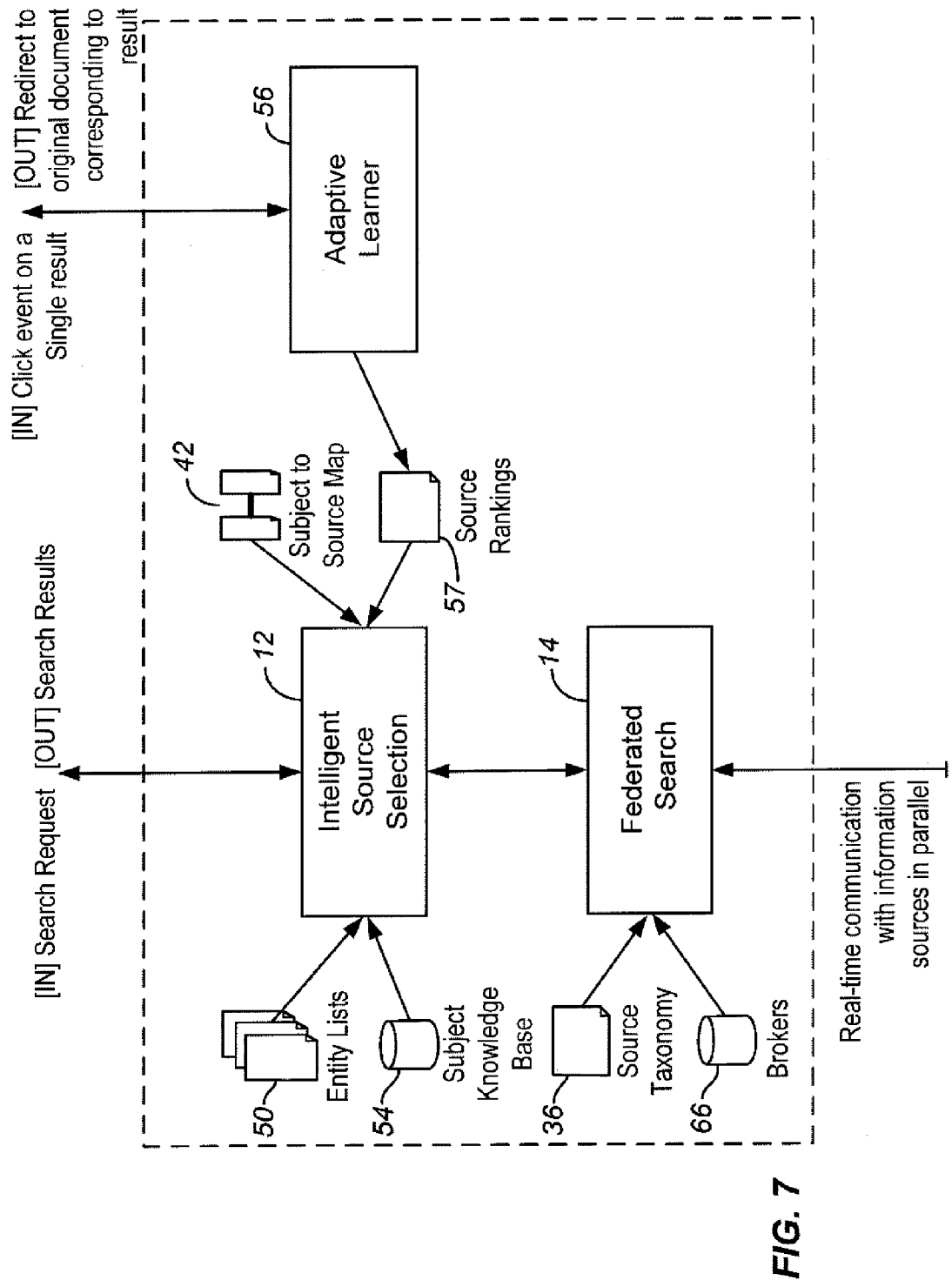
FIG. 7 is a block diagram representation of the interplay between the intelligent source selection, federated search and adaptive learner functions of the exemplary embodiment.

Referring to FIG. 7, as discussed above, the intelligent source selection function 12 utilizes a query analysis algorithm to determine a subject matter or subject matters of the search query, where such identified subject matters are used to help the user identify specific sub-sets of information sources to perform more focused searches. Generally, the query analysis algorithm uses a combination of deterministic look-ups within a group of provided entities lists 50 along with fuzzy look-ups ("auto-categorization") within a knowledge-base 54 to determine within a certain degree of confidence the subject matter of the query. Then, based upon the determined subject matter(s), subsets of information sources can be provided for these subject matter(s) using the subject-to-source map 42.

Examples of entity lists 50 can be found in FIG. 8. For example, an entity list can include a list of ticker symbols or an entity list can include a list of company names. Other representative entity lists could be, for example, health conditions, places, sports, etc. Generally, an entity list 50 is a list of words, names, or other terms that collectively fall under a general subject heading 38 or fall under a specific subject 40. As will be discussed in further detail below, the more general entity lists are referred in the exemplary embodiment as "fall through" lists (having a lower confidence level) and the more specific entity lists are referred to as non-fall through lists (having a higher confidence level).

Figure 9:
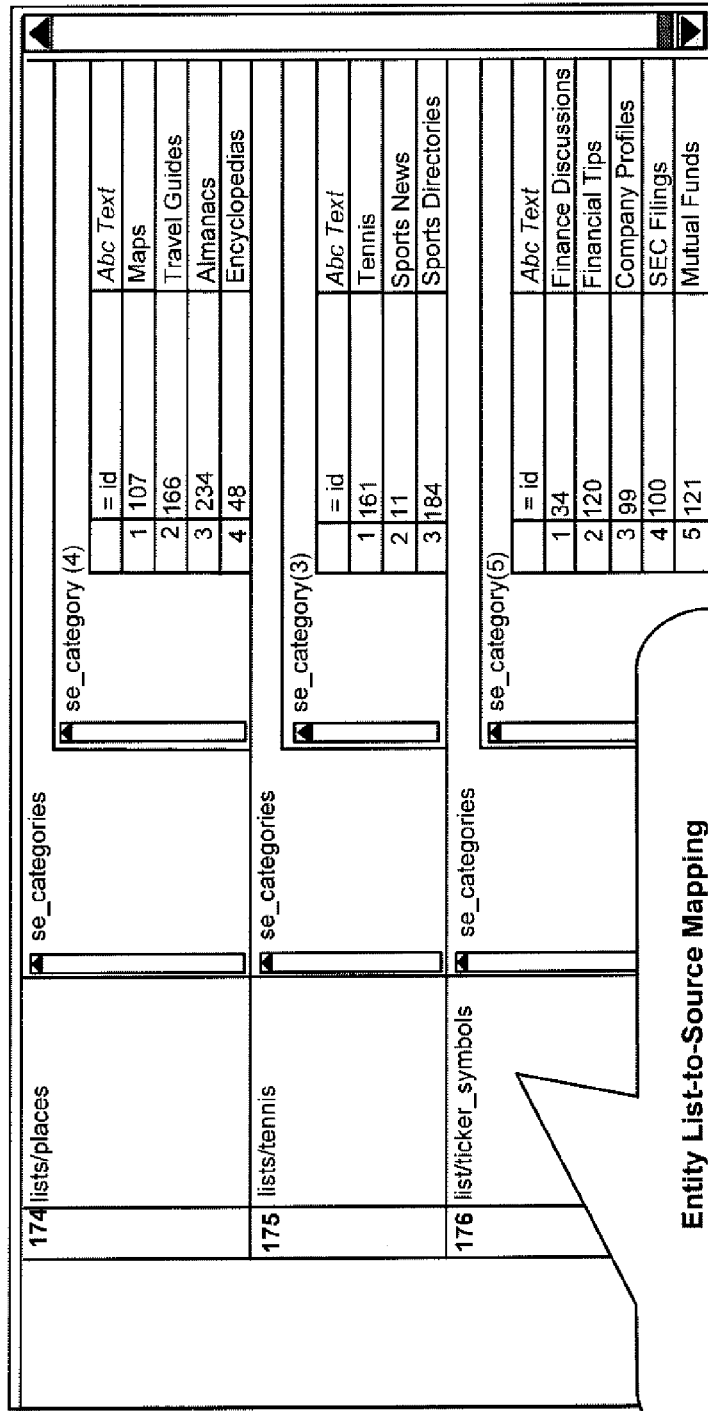
FIG. 9 is an illustration of a structure of mapping entity lists to information sources, maintained in an XML file, of the exemplary embodiment.

FIG. 9 provides an example entity list-to-source mapping 52 which maps certain entity lists directly to specific subject matters. For example, the mapping shown in FIG. 9 includes the entity list "places" mapped to the specific subject matters "maps", "travel guides", "almanacs", and "encyclopedias". Additionally, the entity list "ticker symbols" is mapped to the subjects "financial discussions", "financial tips", "company profiles", "SEC filings", and "mutual funds".

Figure 10:
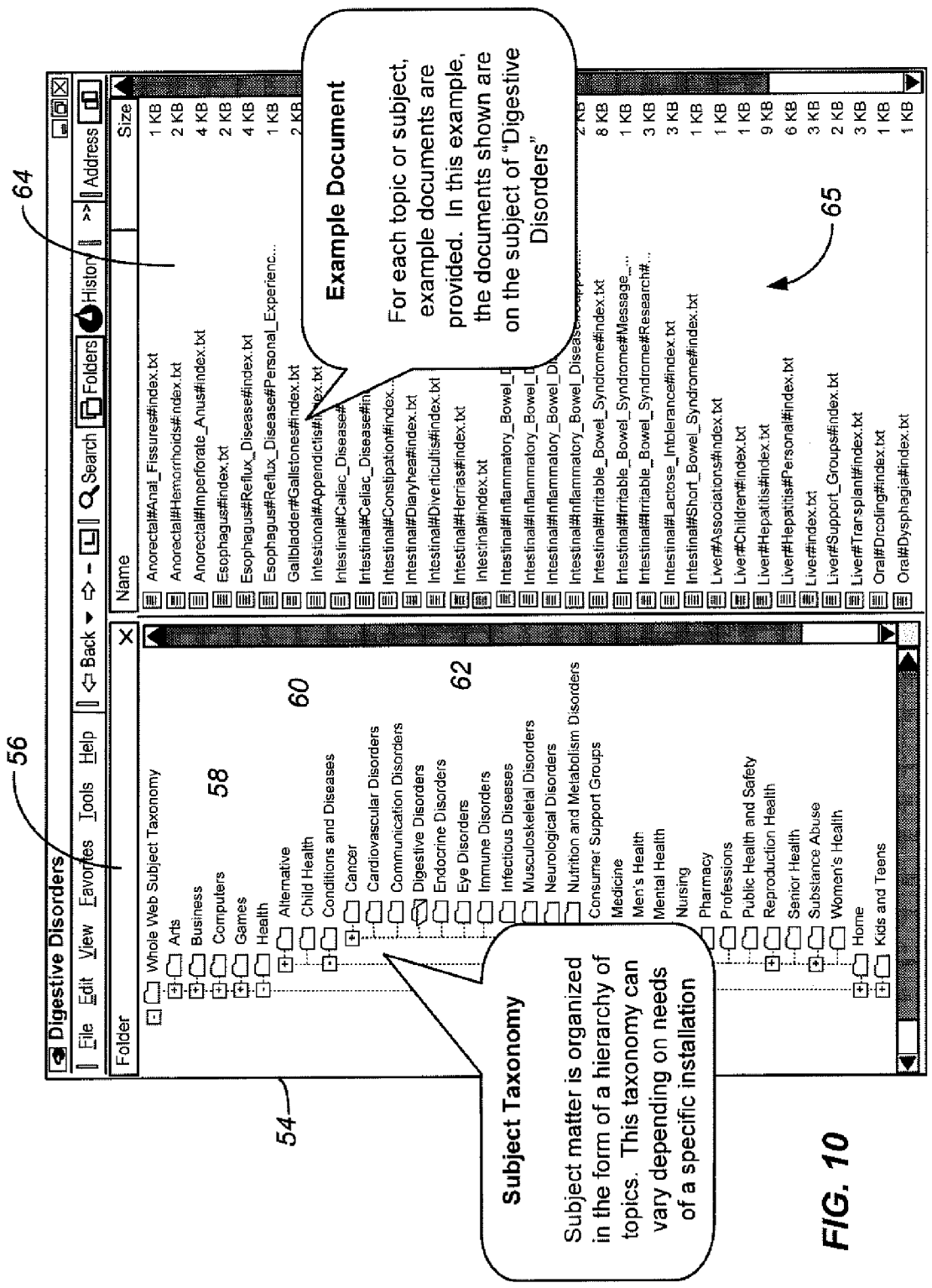
FIG. 10 is an illustration of a subject taxonomy and example documents linked to the subjects in the subject taxonomy, according to the exemplary embodiment.

Referring again to FIG. 7, as mentioned above, the fuzzy look-up step involves a "digital fingerprint" match of terms in the search query with "digital fingerprint" of topics in a subject knowledge-base 54. This methodology is referred to as "auto-categorization", emanating from the problem of trying to "automatically" find the "category" in a taxonomy that a stream of input text corresponds to. An example of the knowledge-base is shown in FIG. 10. The left pane 56 in the display illustrates a subject hierarchy labeled the "Whole Web Subject Taxonomy". The first level 58 in the hierarchy are the general subject headings such as "Health", the next level 60 in the hierarchy includes more specific subject headings such as "Alternative", "Child Health", and "Conditions and Diseases" and the most specific level 62 in the hierarchy includes very specific subject matters such as "Cancer", "Cardio-Vascular Disorders", "Communication Disorders", "Digestive Disorders", etc., which are specific subjects of the "Conditions and Diseases" subject heading in the second tier 60. The right pane 64 of the display provides a list of example documents 65 identified by the administrator as being relevant to the selected subject, "Digestive Disorders", in the specific level 62 of the subject hierarchy 56.

Therefore, once the taxonomy of subjects 56 is created and example documents 65 are provided to represent content typically found for each subject, the system will then learn from these example documents to create the knowledge-base 54 of subject matter representing the ontology. In the general sense, the knowledge-base includes a list of words, phrases or other terms "learned" from the example documents provided for each subject. Generally, the methodology for "learning" from a taxonomy of subjects and example documents for each subject, is based upon creating topic or subject specific "digital fingerprints" using the familiar vector-space model for analyzing and representing a body of unstructured texts. The "digital fingerprints" for topics are, in essence, weighted vectors of terms (words and phrases) that best represent information most likely to be found in those specific topics. This "digital fingerprint" information is then stored in the "subject knowledge-base" for enabling the query analysis.

More specifically, in the vector-space algorithm, a vector-space model is trained off-line by parsing the collection of example documents for each subject to generate a representative vector of terms and frequencies for that subject. In the implementation of the exemplary embodiment, the terms identified can be individual words or phrases (phrases are determined via a measure known as mutual information). Typically, the subject matter vectors are normalized in some fashion, to account for variation in the size and number of training documents. In addition, a uniqueness score is calculated for each term associated with a given subject. This uniqueness score is often referred to as "IDF" for "inverse document frequency" since one over the number of documents that a term appears in is one way to measure uniqueness. In the present exemplary embodiment, the uniqueness score is one over the total of all normalized category vector weights for that term. To classify texts, a vector-space classifier parses the text to be classified to generate the vector of terms in frequencies. This vector is compared with the vectors computed off-line for each subject matter, taking into account the uniqueness of each term. In the implementation of the exemplary embodiment, for each subject matter that has a non-zero normalized weight for all terms in the text vector, and for each term in the text, the term frequency from the text is multiplied with the normalized weight for the subject matter, then that value is multiplied by the uniqueness score for the term exponentiated by a configurable constant. These values are summed to give a score for each subject matter. The resulting values determine which subject matters best match the text.

In the exemplary embodiment, the search query analysis program operates substantially as follows. Given a user's search query, at least portions of the search query (i.e., after possibly eliminating stock words, and/or after stemming remaining words to root form) are compared against zero or more of the entity lists 50, each of which may be stored in RAM as a dictionary. As discussed above, the general entity lists (having lower confidence levels) are designated as fall-through lists, while the more specific entity lists (having a higher confidence value) are designated as non-fall-through lists. Accordingly, the fall-through lists are assigned a confidence score of 1.0 and the non-fall-through lists are assigned confidence scores of 1.5. If the search query is matched with one or more of the non-fall-through lists, then the exemplary embodiment does not perform the "auto-categorization" of the search query; however, if not found in a non-fall-through list, then the query is compared against the "fingerprints" in the knowledge-base 54 to identify subject matters corresponding to the "fingerprint" of the search query. Any matches in this comparison will be assigned confidence levels from 0 to 1 depending upon the confidence of the match. The subject matters developed from the auto-categorization step are added to the array of subject matters developed in the comparison with the entity lists above. At this point, there exists an array of subject matters (entity list names and subject headings from the knowledge-base) along with associated confidence levels, where the array is sorted by the confidence level. Each entry in the subject matter array is linked to a sub-set of information sources using the subject-to-source map 42 as discussed above. In the exemplary embodiment, if a particular subject category from the array is not found in the subject-to-source map 42, the parent category will be checked for a sub-set of information sources. For example, if the subject matter heading "health/conditions&diseases/digestive_disorders" is not found, then a look-up will be made for "health/conditions&diseases". This step is repeated until a sub-set of information sources is matched to the subject matter (i.e., if "health/conditions&diseases" is not matched with a sub-set of information sources, then a look-up will be made for the general heading of "health"). Thus, an array of searchable information source groups associated with the array of subject matters and associated confidence levels has been constructed.

Furthermore, each information source in each respective sub-set of information sources may also be ranked with respect to each other utilizing the adaptive learner function 56. Generally speaking, the adaptive learner function 56 provides a method for prioritizing the information sources by rating (in real-time) the information sources based upon the popularity of the source or upon other performance or statistical considerations (or combinations thereof) to provide performance scores 57 for the information sources. The adaptive learner process is a means to learn the on-going performance of sources (in the manner in which they return relevant results to users on various subjects), so that the intelligent source selection function 12 continually improves and keeps pace with the changing content or behavior of the individual sources. From a simplistic perspective, this method simply rates the up-to-minute popularity of each source for each subject in the ontology.

As shown in FIG. 11, an internal database 58 maintains an internal ranking of the performance of sources in specific subject areas. For example, the highlighted source in FIG. 11 "Mayo health" database has been rated as the best performing source by the system having a performance score 57 of 0.61. Some of the performance criteria utilized in adjusting this performance score include: (a) adjusting the performance score based upon the number of times users access the source from search result listings; (b) adjusting the score based upon the amount of time spent on each source; (c) adjusting the score based upon access problems or performance of the source (such as, lowering the score if users have trouble accessing the source at various times); and (d) adjusting the score based upon user feedback, such as through questionnaires or rating polls. The impact of the adaptive learner function 56 is not typically instantaneous to start with. Depending on the subject-spread of the queries being performed, the source is put to use, and the volume of users and queries, the adaptive learner process 56, over time, provides a reasonably accurate measure of the performance of specific sources on specific subjects.

As mentioned above, the adaptive learner process 56 gauges the "popularity" of a particular information source for a particular subject measured, in the exemplary embodiment, through result "click-throughs" from the community of users. The result links returned from the federated search function 14 are directed to a "click-through" handler when activated by a user. The "click-through" handler redirects the user's browser to the actual result after optionally updating the per-source category weights for the information sources that returned the result. Optionally, the per-source category weights can be adjusted by the "click-through" handler periodically (i.e., every $100^{th}$ access) to reduce the rate of change. In the exemplary embodiment, each result link returned from the federated search function 14 include the following: the original result link; a list of the information sources that returned the result; the ESS query; and a list of the subjects assigned to the search query.

In addition to the "click-through" handling described above, the following measures can also be used to stabilize the "learning loop".

1. Measure the duration of time the user spent looking at/reading through a give result document and use this to discern the "usefulness" of the document to the user, and by correlation, the usefulness of the information source that returned that document for the subject corresponding to the search query;
2. Categorize the result document matched up with the subject corresponding to the user's search query; and/or
3. Assign a penalty (something the would reduce the weight value) to information sources, or are slow to respond periodically.

Referring again to FIG. 7, the federated search function 14 performs the substantially parallel real-time searches on the plurality of information sources. The federated search function 14 utilizes brokers 66 which are electronic definitions stored on the system that define for each of the information sources to the federated search function 14 how to interface with the respective information source; for example, how the federated search function 14 is to communicate with the information source, how the federated search function is to structure its queries (in its native form) to the specific information source, how the federated search function 14 interprets results from the particular information source, how the federated search function is to navigate through multiple "pages" of the results set from the specific information source, any security methods used by the particular information source, etc. An example broker definition for the Intellihealth.com information source is provided in FIG. 12.

The present invention also makes it possible for non-operational brokers (brokers can become non-operational if the information source they correspond to ceases to exist, moves to a different location, delivers different content, delivers content in a different format, has new capabilities for search and retrieval, has new security structures, etc.) to be healed automatically through an automated background testing process.

As mentioned above, the brokers 66 can provide the security parameters and credentials necessary for federated search system to access a secure or subscription information source or sources 22. Consequently, the present invention also provides a security handling architecture that enables the system to proxy user credentials for multiple users to multiple secure sources using multiple security methods in real-time.

Figure 13:
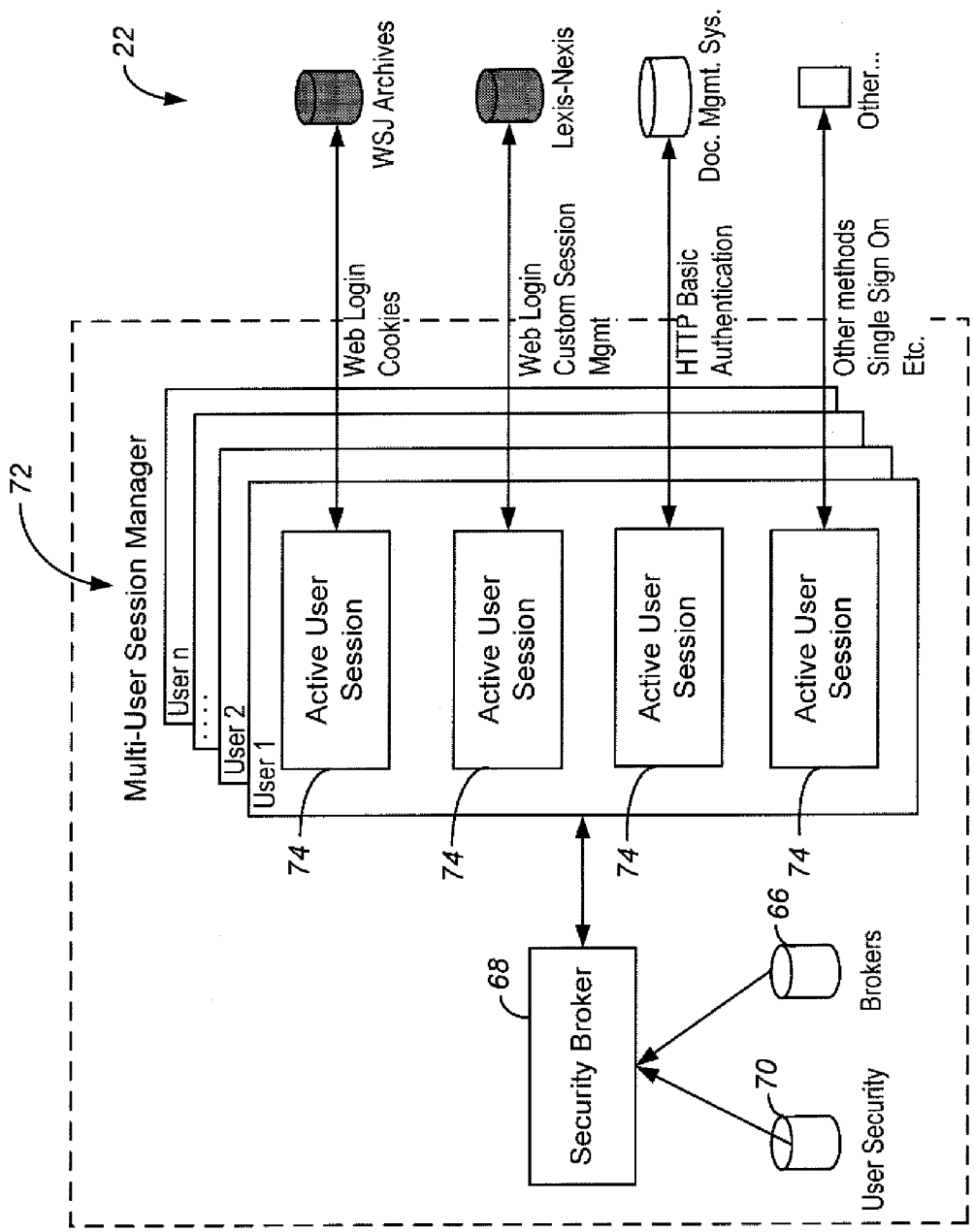
FIG. 13 a block diagram representation of the multi-user, multi-source, multi-modal secure information source architecture according to the exemplary embodiment.

As shown in FIG. 13, the multi-user, multi-source, multi-modal security architecture utilizes a security broker function 68 within the federated search system that utilizes user security information 70 and security parameters embedded within the brokers 66 to drive the multi-user session manager 72. The multi-user session manager 72 creates an active user session 74 for each secure source 22 respectively accessed by each user. Therefore, if, for example, WSJ Archives are accessed by thirty-three of the active users, then thirty-three active user sessions 74 will be created for each individual access.

Figure 14:
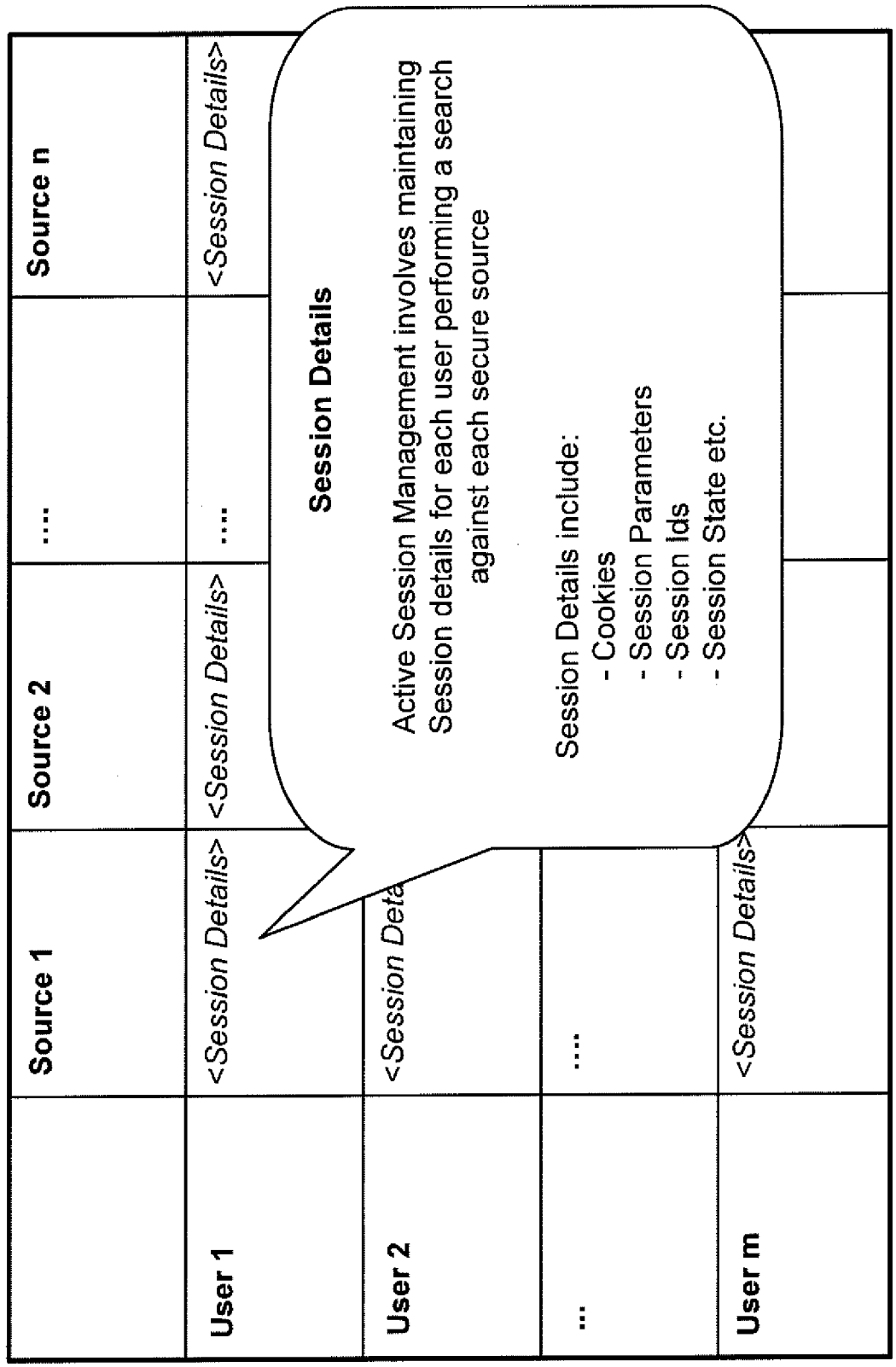
FIG. 14 is an illustration of a session-details database utilized by the exemplary embodiment for secure information source handling.

The security broker 68 is invoked during the federated search function 14 for each secure information source in the search request. The security broker 68 examines the broker definition 66 to determine the type of authentication (e.g., basic authentication, challenge-response, log-in form, etc.) required by the secure information source 22. For secure information sources that use a log-in form, the broker definition 66 will also describe the log-in parameters used by the information source. Next, the security broker 68 retrieves the authentication credentials 70 assigned to the user for the secure information source. This information is stored in the user security database 70. Using the combined information, the security broker 68 performs the initial steps in the establishment of the per-user session and verifies that the session has been successfully initialized. If the secure information source uses session parameters, the security broker 68 extracts the parameters from the response and stores them in the respective active user session 74. From this point on, the federated search process 14 proceeds normally. If the secure information source 22 uses session parameters, the security broker 68 will be re-invoked at each step in the search process to transmit the appropriate session parameters for the respective active user session 74. As discussed above, the session manager 72 is responsible for maintaining a separate active user session 74 for each user/source combination. Separate "session parameters" are maintained by the session manager 72 for each active user session 74. FIG. 14 illustrates the conceptual organization of the internal security information structure maintained by the session manager.

As shown in FIG. 14, session parameters are stored in "Session Details" records and state is managed for each secure source searched by each user in real-time. Such session parameters may include, cookies, session parameters, session IDs, sessions date, etc. The session parameters will vary depending upon the mode, type of security encountered at each secure source. Using this dynamic security information structure, the session manager 72 maintains the integrity of the unique security requirements at each secure source 22 in a multi-user environment, while at the same time, not compromising a user's privacy of individual security requirements. It should be understood that it is within the scope of the invention that at least certain of the security credentials and/or session parameters may be shared by certain users (or groups of users) during the accessing and/or searching steps. These shared credentials/parameters may be included in the "Session Details" records for each user or in a shared record accessible for all users sharing the credentials/parameters.

Figure 15:
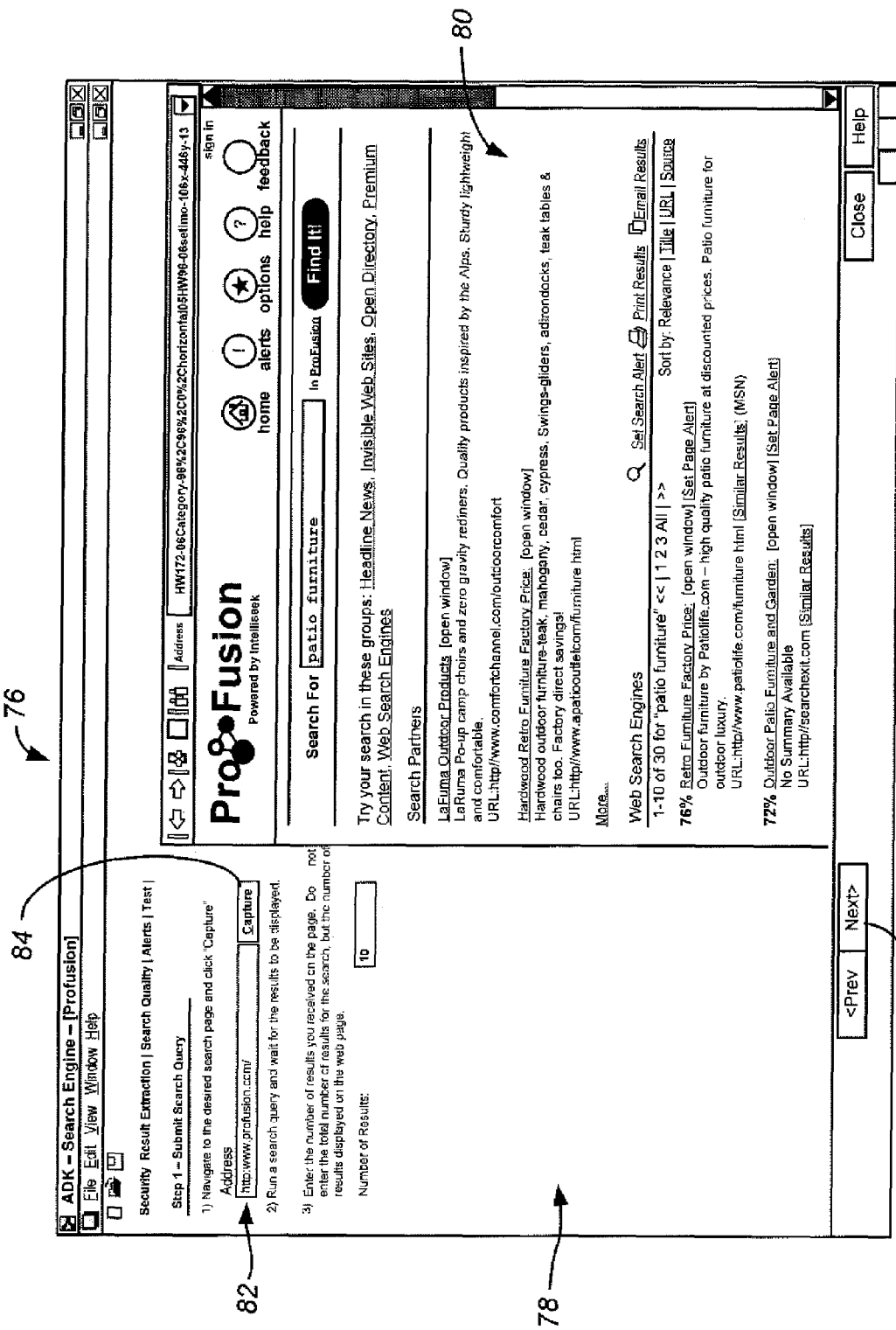
FIG. 15 is an example screen shot of the exemplary embodiment illustrating an initial stage of the broker-definition tool.

FIG. 15 illustrates a visual broker-definition tool 76 (referred to as the "Agent Development Kit" or "ADK") that provides the exemplary embodiment of the present invention with the ability to create the brokers 66 for the information sources using a substantially automated process. This broker-definition tool 76 automatically analyzes the structure and form from the search result content generated by a searchable information source to determine patterns that exist within it; and automatically generates the necessary pattern extraction logic for the broker substantially without any user involvement. The broker-definition tool 76, in this exemplary embodiment, utilizes familiar "wizards" interface in a left pane 78 to guide the user rapidly through the broker generation process. The right pane 80 provides visual results of the information source search result output or of the broker output. As can be seen in FIG. 15, the interface pane 78 first requests that the user enter the information source address in field 82 and activate the "Capture" icon 84. In the right pane 80 the graphical interface for the selected information source is presented. Next, the interface 78 requests that the user run a search query on the requested information source and wait for the results to be displayed. As can be seen in the right pane 80 on FIG. 15, the user has requested a search for documents related to "patio furniture". Finally, this interface 78 requests that the user enter the number of results received on the page shown in the pane 80. When these three steps are completed, the user activates the "Next" icon 86.

Figure 16:
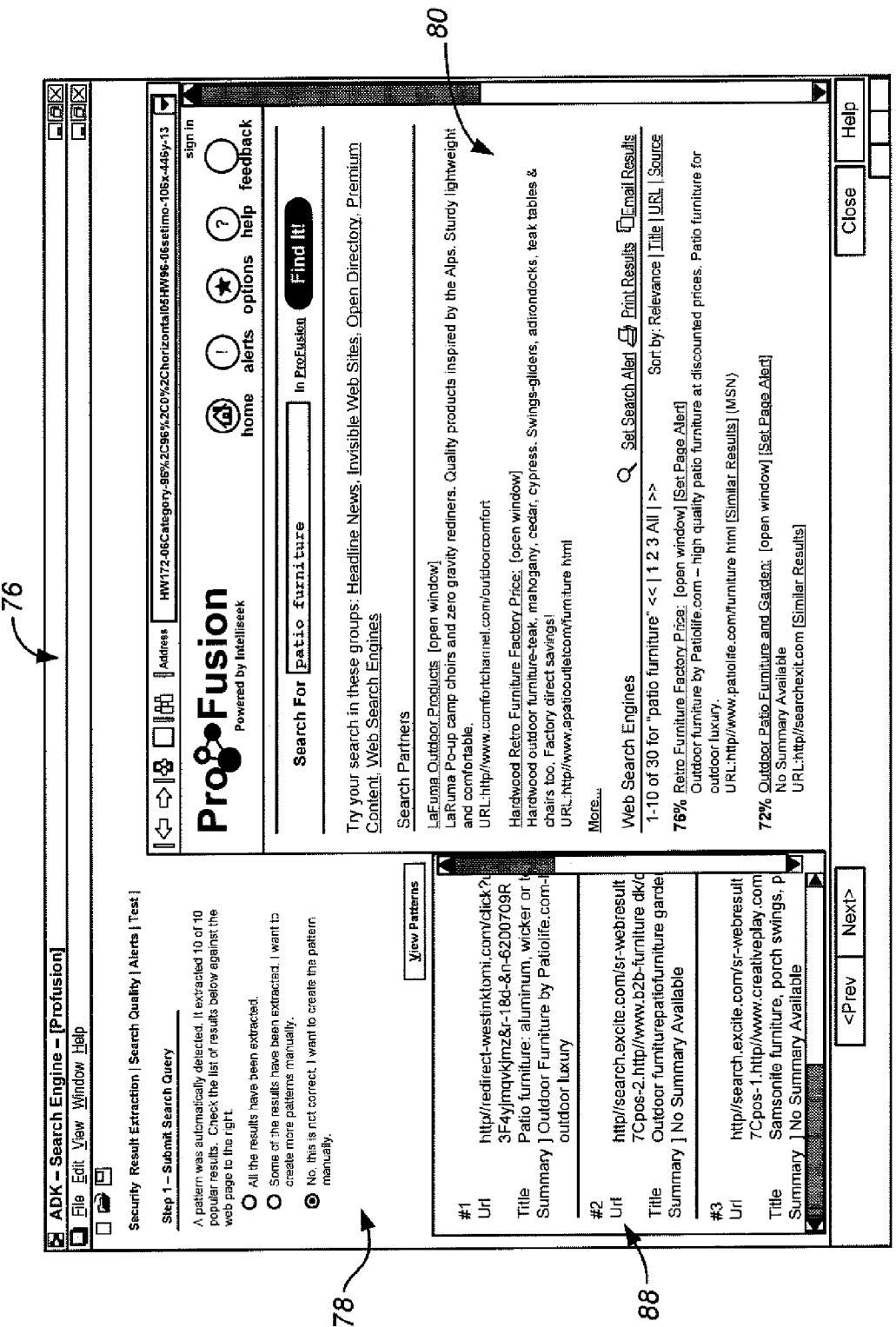
FIG. 16 is an example screen shot of the exemplary embodiment illustrating an extraction testing stage of the broker-definition tool.

Referring to FIG. 16, the broker-definition tool 76 then automatically extracts search results 88 from the search results generated by the information source shown in the pane 80. The broker-definition tool accomplishes this utilizing automatic pattern detection, extraction and generation. The basis for this process can be understood by noting that virtually every searchable source provides its search output through a program-generated HTML page. Inherent in this observation is the fact that program-generated pages (especially where repeating elements are included, like a series of search results) have some pattern driving its production. This makes it possible, in most cases, to put together a methodology to find that pattern, and generate logic to extract it. Consequently, the broker-definition tool extracts the search results from the information source, generally, using the following methodology; first, the HTML document corresponding to the result page shown in the pane 80 is saved locally to a file; next, the file is parsed utilizing a specialized parser that distills the "structure" of the page (locating tables, paragraphs, divisions, etc.) from the "cosmetics" of the page (what font is being used, what color is being used, where an image is inserted, etc.); next, with this distilled structure of the page, the broker-definition tool proceeds to find "blocks" of structure (paragraphs, table rows, tables, etc.) repeating some minimum number of times (the broker-definition tool takes the input provided by the user on the previous page answering the question "enter the number of results you received on the page."); next, if at least some minimum number of repeating blocks are discovered, then the broker-definition tool looks to see that these blocks contain some essential elements that are typical of search results ("essential elements", for example, are fields or entities such as a URL—a link to a detailed record, a title—a brief title of the individual results, a date, a summary, etc.); next, if the blocks have been found to contain at least some of these essential elements, the broker-definition tool proceeds to create "regular expressions for each of these fields" and one for the blocks representing the result record; with the regular expressions in place, the broker-definition tool proceeds to apply the regular expression on the text of the original result page and extracts only those portions of the next that correspond to the result records and fields contained within them; finally, these extracted results are then displayed in the left pane 88 as shown in FIG. 16.

A "regular expression" is a classic computer science device utilized to "extract" the desired portion of text or other information from a larger stream of text. See http://www.python.org/doc/lib/re-syntax.html or http://msdn.microsoft.com/library/default.asp?url=/
       library/en-us/script56/html/
       js56jsgrpRegExpSyntax.asp for more information on regular expressions. Typically, regular expressions have been created by advanced/power users or developers for solving information extraction problems. The broker-definition tool methodology takes this powerful method and makes it work in a simple visual interface.

If the broker-definition tool 76 is successful in performing the automatic pattern detection, regular expression generation and result extraction for every single source available, then the broker generation process could indeed become 100% automatic. Nevertheless, the process is semi-automated because there are typically situations where there are exceptions that cannot be dealt with automatically by the broker-definition tool such as, for example: when unique fields of information exist within the result records, (for example, a thumbnail picture, a price, a delivery date, etc., that may all be specific to a search source, these need to be specified by the user and then the broker-definition tool can generate the expressions for them); and when the search result records vary in structure for each record (for example, the source may optionally include, for example, a special discount price only for a few of the returned records).

Figure 17:
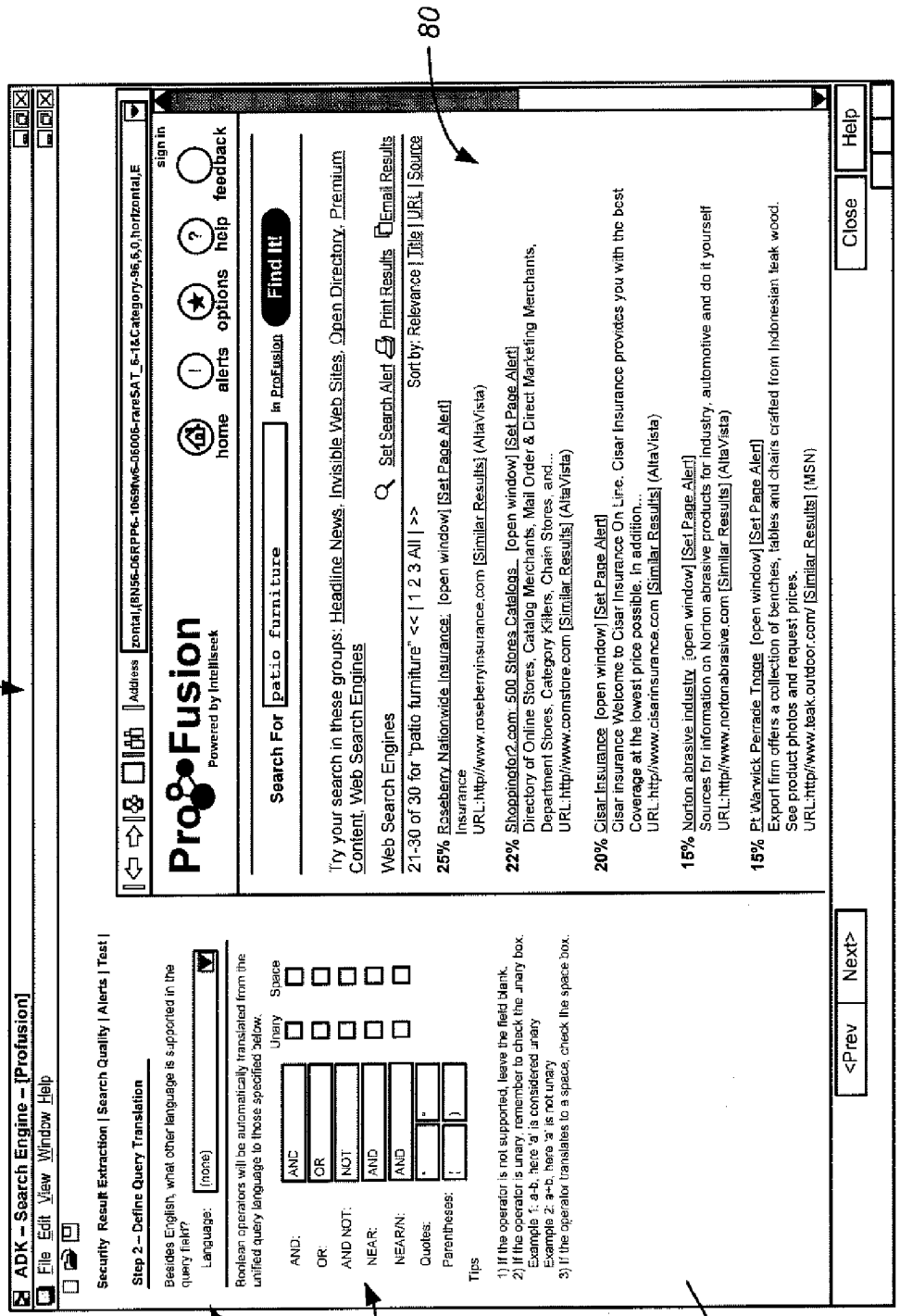
FIG. 17 is an example screen shot of the exemplary embodiment illustrating a query definition stage of the broker-definition tool.

FIG. 17 illustrates a source-specific "search query translation" in the interface 78 of the broker-definition tool 76 to enable universal searches to be conducted using a single query language to multiple disparate sources. As shown in FIG. 17, in the interface pane 78 the user is able to select alternate languages other than English that are supported in the information source's query field. Then, the interface provides fields 92 where the user can specify the symbols or terms used for the boolean operations of a general search tool. Therefore, the system of the exemplary embodiment of the present invention implements capabilities such as searching for "all of the words", "any of the words", "phrase", "boolean". Boolean queries specifically allow users to combine terms using operators such as 'AND', 'OR', 'AND NOT', 'NEAR', 'NEAR/N' to accurately gather the type of information needed. Each information source, however, is equipped with different levels of capability for searching the information repositories they provide access to. Specifically, the query language syntax may vary widely. For example, in some sources, the search for <"pancreatic cancer" and "treatment protocol"> may be expressed as

<+"pancreatic cancer"+"treatment protocol">

This means that queries provided for federated searching by users need to be "translated" into the native syntax for each source by the brokers 66. This query translation is specified through the broker definition process, and it enables universal searches to be conducted using a single query language to multiple disparate sources.

Figure 18:
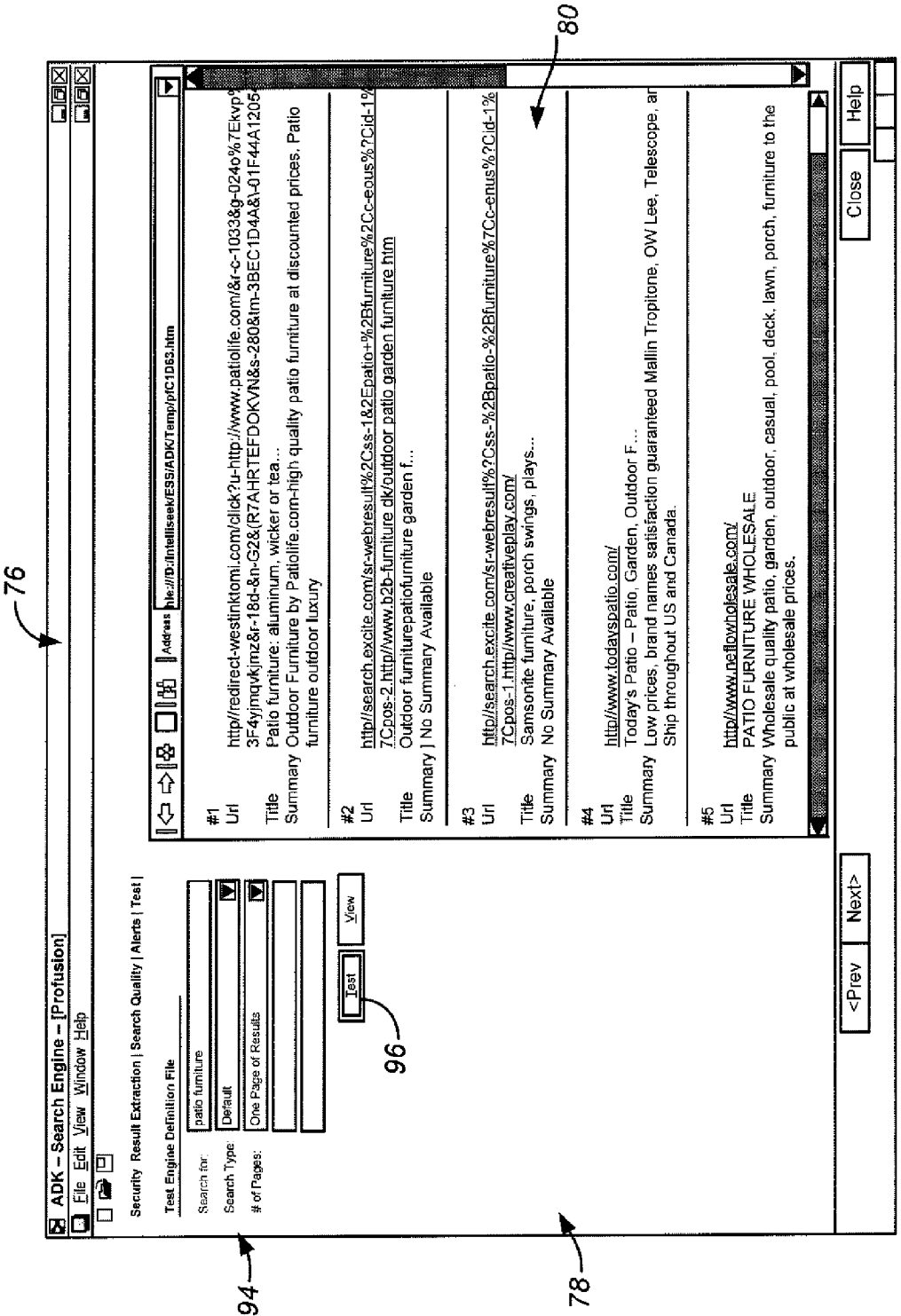
FIG. 18 is an example screen shot of the exemplary embodiment illustrating another testing stage of the broker-definition tool.

FIG. 18 illustrates a self-contained testing capability within the broker-definition tool 76 that permits a broker that has been created to be tested immediately. The interface pane 78 provides fields 94 for the user to enter a search query, a search type and list the number of pages in the results. These fields may also request a user name and password if the source is a secure source. Once these fields are filled in the user activates the "test icon" and a testing interface will actually perform a live query against the information source (for which the broker is being defined), just as the federated search function 14 would in the run-time system, and gathers the result data, and applies the broker definition to extract result records in all the defined fields of each result record. This extracted result set is presented in the right pane 80 to give instant feedback to the user on how well their broker definition is working and if it is ready for deploying to the run-time system.

Figure 19:
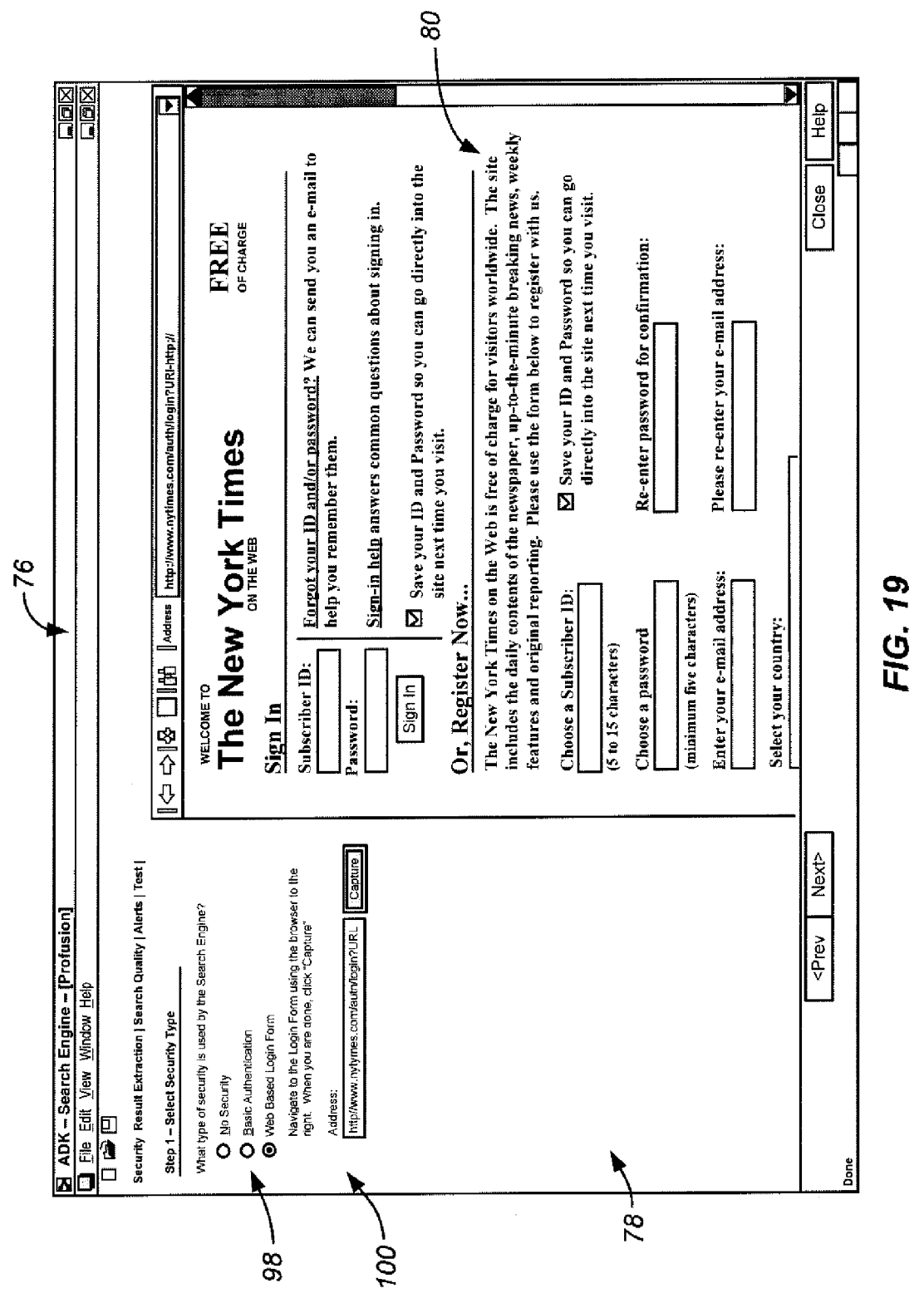

FIG. 19 illustrates how the broker-definition tool 76 is able to capture security information for a secure source. The broker definition can capture information by multiple security methods including the standard "HTTP basic authentication", and "web-based log-in forms". As shown in FIG. 19, the interface pane 78 includes a form 98 in which the user can identify the type of security that is being used by the search engine and a field 100 where the user enters the URL or address of the secure information source. Once the log-in page for the secure source is loaded into the right pane 80, the broker-definition tool captures the necessary log-in details, such as navigating the log-in form, logging in, navigating to the search interface, etc., by "watching" (recoding) the user's interaction with the information source in the right pane 80. These security credentials will then be stored in the brokers 66 as discussed above. As also discussed above, the security broker 68 during the federated searching function 14 will essentially "replay" the log-in process to connect to the secure information source, and to supply the user's credentials for that source transparently, prior to performing a search. Nuances such as handling session cookies that may be set for each user, by each secure source, are transparently handled by the security broker 68 at run-time.

Following from the above description and invention summaries, it should be apparent to those of ordinary skill in the art that, while the systems and processes herein described constitute exemplary embodiments of the present invention, it is to be understood that the invention is not limited to these precise systems and processes and that changes may be made therein without departing from the scope of the invention as defined by the claims. Additionally, it is to be understood that the invention is defined by the claims and it is not intended that any limitations or elements describing the exemplary embodiments set forth herein are to be incorporated into the meaning of the claims unless such limitations or elements are explicitly listed in the claims. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A computer implemented method for accessing information from a plurality of searchable information sources comprising the steps of:
   analyzing a user's search query to determine a subject matter of the query;
   selecting a subset of information sources from the plurality of information sources based upon the determined subject matter of the query, the subset of information sources associated with the determined subject matter of the query;
   searching a standard information source for documents relevant to the search query;
   displaying the results of searching the standard information source, a description of the subset of information sources, and an option to search the subset of information sources, the option identified by the determined subject matter of the query;
   searching the subset of information sources for documents relevant to the search query in response to selection of the option; and
   simultaneously displaying the results of searching the standard information source and of searching the subset of information sources, wherein the results of searching the subset of information sources are segregated for each of the information sources in the subset of information sources and from the results of searching the standard information source.

2. The computer implemented method of claim 1, wherein the standard information source is the World Wide Web.

3. The computer implemented method of claim 1, wherein the subset of information sources is maintained on a private computer network.

4. The computer implemented method of claim 1, wherein each information source in the subset of information sources is assigned a performance score pertaining to at least one of performance quality of the information source.

5. The computer implemented method of claim 4, wherein the results of searching the information sources in the subset of information sources are segregated according to the performance scores of the information sources in the subset of information sources.

6. The computer implemented method of claim 1, wherein the results of searching the standard information source and the results of searching the information sources in the subset of information sources are displayed in parallel in a screen display.

7. The computer implemented method of claim 1, wherein the subset of information sources comprise one or more secure sources and at least one non-secure source, and wherein searching the subset of information sources further comprises:
   storing security credentials necessary for accessing the one or more secure sources;
   accessing each of the secure sources substantially in parallel utilizing the security credentials, wherein the security credentials address security requirements specific to each of the secure sources;
   accessing the at least one non-secure source; and searching each of the accessed secure sources and the at least one non-secure source for documents relevant to the search query.

8. The computer implemented method of claim 7, wherein the security credentials are stored in a database, wherein the database includes a table for each user, and wherein each table includes a set of respective security credentials for accessing each of the secure sources by each respective user.

9. The computer implemented method of claim 7, wherein the step of storing security credentials includes the steps of recording each user's security credentials as the user preliminarily enters the one or more secure sources and storing the recorded user's security credentials for accessing the one or more secure sources.

10. The computer implemented method of claim 9, wherein recording each user's security credentials as the user preliminarily enters the one or more secure sources and storing the recorded user's security credentials for accessing the one or more secure sources includes providing a visual tool to the user that displays a log-in page for the one or more secure sources and has the user perform a step of logging into the one or more secure sources provided by the visual tool, wherein the visual tool records the user's security credentials during the log-in step.

11. The computer implemented method of claim 1 further comprising generating a searchable source broker for defining patterns in the results of searching the subset of information sources, wherein the step of generating the searchable source broker further comprises the steps of:
  accessing a searchable information source in the subset of information sources;
  performing an example search on the searchable information source to produce search results by the searchable information source;
  identifying regular expressions from the search results, wherein identifying regular expressions includes extracting a desired portion of text from the search results; and
  applying the regular expressions to the search results.

12. The computer implemented method of claim 11, further comprising the step of simultaneously displaying to the user, the search results and the output of applying the regular expressions to the search results.

13. The computer implemented method of claim 11, wherein the step of identifying regular expressions includes the steps of:
  parsing the search results to distill a structure of the search results;
  identifying repeating blocks of information from the parsed search results;
  identifying essential search-result elements from the repeating blocks of information; and
  generating the regular expressions for each element of the search results.

14. The computer implemented method of claim 11, wherein the accessing step includes the steps of:
  providing a log-in form for the searchable information source;
  logging into the searchable information source by entering the appropriate log-in information to the log-in form by the user;
  recording security credential information provided by the user during the logging step; and;
  storing the security credential information with the searchable source broker for re-use by the searchable source broker in a federated search system.

\* \* \* \* \*